US012167167B1

(12) United States Patent
Oostergo et al.

(10) Patent No.: US 12,167,167 B1
(45) Date of Patent: *Dec. 10, 2024

(54) APPLICATION-BASED CONTROL OF DEVICES WITHIN AN ENVIRONMENT

(71) Applicant: Amazon Technologies, Inc., Seattle, WA (US)

(72) Inventors: Milo Oostergo, Eemnes (NL); Gary Zhong, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,862

(22) Filed: Oct. 31, 2023

Related U.S. Application Data

(63) Continuation of application No. 15/992,558, filed on May 30, 2018, now Pat. No. 11,863,905.

(51) Int. Cl.
*H04N 7/15* (2006.01)
*H04L 12/28* (2006.01)
*H04W 4/029* (2018.01)
*H04W 4/80* (2018.01)

(52) U.S. Cl.
CPC .......... *H04N 7/152* (2013.01); *H04L 12/282* (2013.01); *H04W 4/029* (2018.02); *H04W 4/80* (2018.02)

(58) Field of Classification Search
CPC ..... H04N 7/152; H04L 12/282; H04W 4/029; H04W 4/80
See application file for complete search history.

(56) References Cited

U.S. PATENT DOCUMENTS

| 8,840,250 | B1 | 9/2014 | Yao et al. |
| 9,606,817 | B1 | 3/2017 | Efstathopoulos |
| 9,807,857 | B2 | 10/2017 | Huang |
| 2002/0105623 | A1 | 8/2002 | Pinhanez |
| 2010/0226487 | A1 | 9/2010 | Harder et al. |
| 2012/0244836 | A1 | 9/2012 | Colbert |
| 2012/0249013 | A1 | 10/2012 | Valois et al. |
| 2013/0210401 | A1 | 8/2013 | Knaz |
| 2014/0173701 | A1 | 6/2014 | Albouyeh et al. |
| 2015/0043426 | A1 | 2/2015 | Aggarwal et al. |

(Continued)

OTHER PUBLICATIONS

Office Action for U.S. Appl. No. 15/992,558, mailed on Mar. 5, 2019, Oostergo, "Application-Based Control of Devices within an Environment", 19 pages.

(Continued)

*Primary Examiner* — Phung-Hoang J Nguyen
(74) *Attorney, Agent, or Firm* — Lee & Hayes, P.C.

(57) ABSTRACT

A mapping between environments and devices included therein may be maintained, such that a configuration of each environment is known. Upon detecting that a user is within an environment, and based on a current device state of devices within the environment, an application may be generated and presented to the user via a corresponding user device. The application may allow the user to activate and control the devices within the environment. In particular, the application may depict selectable controls that correspond to functions or operations associated with the different devices within the environment. The application may also be dynamically updated based on an updated current device state of the devices.

20 Claims, 8 Drawing Sheets

(56) References Cited

U.S. PATENT DOCUMENTS

| | | |
|---|---|---|
| 2015/0230167 A1 | 8/2015 | Choi et al. |
| 2015/0314454 A1* | 11/2015 | Breazeal ................. G10L 15/32 700/259 |
| 2015/0347114 A1* | 12/2015 | Yoon ................... H04L 12/2832 717/176 |
| 2016/0352673 A1 | 12/2016 | Flores et al. |
| 2017/0017822 A1 | 1/2017 | Zimmerman |
| 2017/0026612 A1* | 1/2017 | Rintel ..................... G06F 3/012 |
| 2017/0195424 A1 | 7/2017 | Nasir et al. |
| 2017/0230461 A1 | 8/2017 | Verma et al. |
| 2017/0264446 A1 | 9/2017 | Rose et al. |

OTHER PUBLICATIONS

Office Action for U.S. Appl. No. 15/992,558, mailed on Mar. 9, 2023, Oostergo, "Application-Based Control of Devices within an Environment", 17 pages.
Office Action for U.S. Appl. No. 15/992,558, mailed on Aug. 3, 2022, Oostergo, "Application-Based Control of Devices within an Environment", 44 pages.
Office Action for U.S. Appl. No. 15/992,558, mailed on Nov. 18, 2022, Oostergo, "Application-Based Control of Devices within an Environment", 21 pages.
Office Action for U.S. Appl. No. 15/992,558, mailed on Mar. 1, 2022, Oostergo, "Application-Based Control of Devices within an Environment", 27 pages.
Office Action for U.S. Appl. No. 15/992,558, mailed on Aug. 14, 2019, Oostergo, "Application-Based Control of Devices within an Environment", 21 pages.

* cited by examiner

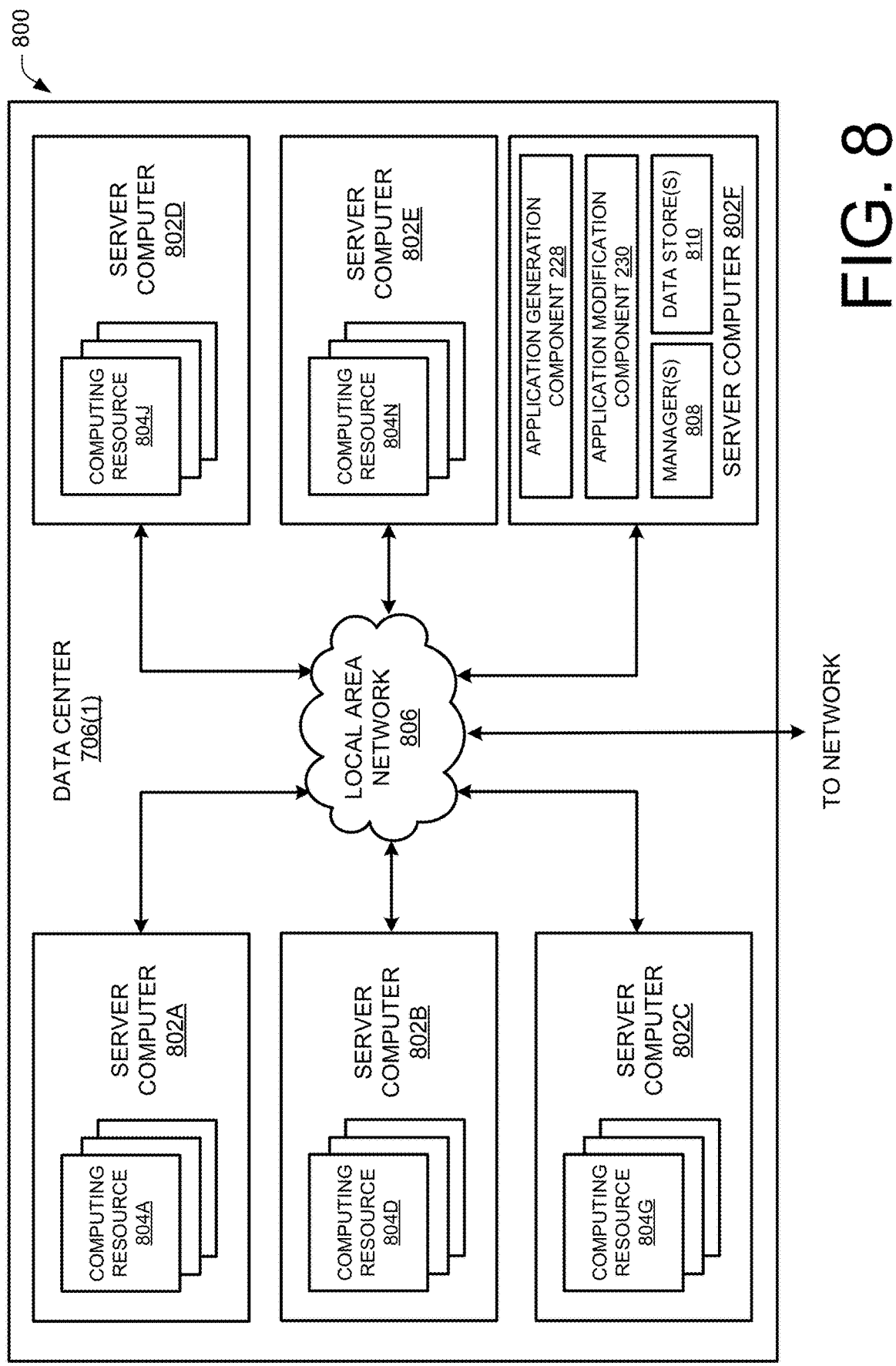

APPLICATION-BASED CONTROL OF DEVICES WITHIN AN ENVIRONMENT

CROSS-REFERENCE TO RELATED APPLICATIONS

This application claims priority to and is a continuation of U.S. patent application Ser. No. 15/992,558, filed on May 30, 2018, the entire contents of which are incorporated herein by reference.

BACKGROUND

Existing systems allow users to enter a conference room and activate/control conferencing equipment via voice commands. For instance, upon entering a conference room, a user may state "initiate meeting" or "join meeting," and the conferencing equipment will initiate or join the meeting for the user, such as by powering on and/or connecting one or more displays, speakers, microphones, and so on. However, while an audio or video conference is ongoing, the user may not want to utter voice commands to cause certain operations to occur. Such voice commands may interrupt the audio/video conference and cause a distraction to the user, as well as other users that are participating in the audio/video conference.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 8 is a block diagram that illustrates one configuration for a data center that implements aspects of a service provider network, including some or all of the concepts and technologies disclosed herein.

DETAILED DESCRIPTION

Figure 1:
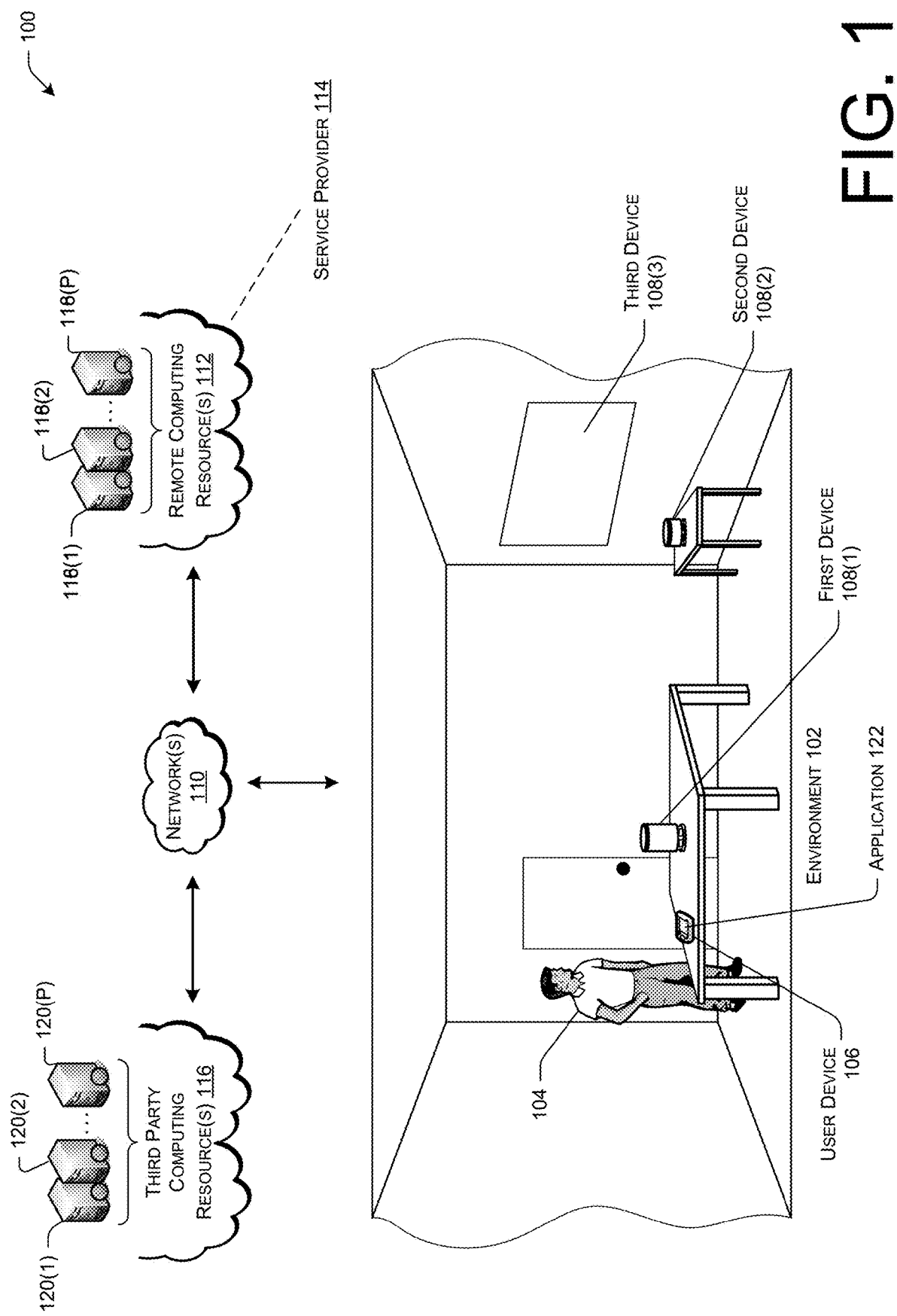
FIG. 1 illustrates an example environment in which a user can activate or control devices or components within the environment using an application.

The systems and/or processes described herein are directed to generating and presenting an application, via a user device of a user, that depicts devices and/or components within an environment at which the user is currently located, where the functionality or capabilities of the devices/components are based on the current state of such devices/components. In some embodiments, a user may want to start, join, or stop a video conference within an environment, where a video conferencing system may cause audio and video signals to be transmitted between the environment and one or more different locations where other individuals may be present. For instance, the user may audibly utter a voice command, such as an instruction to start, join, or stop a video conference. As a result of this voice command, audio data and video data may be presented within, and transmitted to, different environments at which participants of the video conference are located. As a result, the individual may conduct a live video meeting with individuals in a remote location, which may replicate or simulate the individuals all being within the same environment/room for the meeting.

The environment in which the video conference (or audio conference or teleconference) is to occur may include various devices and/or components, such as video conferencing equipment (e.g., displays, microphones, speakers, etc.), lights, a thermostat, curtains/blinds, etc. Such devices/components may be activated or controlled by the user using voice commands (e.g., "initiate video conference," "dim lights," "increase volume," etc.). However, while a video conference is ongoing, a user uttering these types of voice commands may be disruptive and may interrupt the meeting. Accordingly, the systems and processes described herein may allow a user to activate and control devices/components within the environment using an application (or a website) that depicts such devices/components. In particular, the application may depict one or more functionalities or capabilities of the devices/components within the environment based on a current device state of such devices/components. For instance, if a video conference has yet to be initiated, the application may depict selectable controls to allow the user to join or initiate the video conference, or to power on/activate video conferencing equipment (e.g., a display, speakers, a microphone, etc.) that will be used to facilitate the video conference. However, if a video conference is ongoing, the selectable controls may correspond to muting a microphone, adjusting the volume, adjusting a view on a display, and/or ending the video conference. Likewise, if lights are currently turned off within the environment, the application may depict selectable controls to allow the user to turn on the lights. However, if the lights are determined to be on, the application may depict selectable controls to allow the user to adjust the brightness of the lights (e.g., "dim lights," "brighter," etc.), and/or to turn off the lights.

In various embodiments, the devices or components within the environment may be communicatively coupled to one or more remote computing resources associated with a service provider, or possibly to third party computing resources associated with a third party entity. The remote computing resource(s) may store device information, which indicates which devices and/or components are included within different environments, such as conference rooms. For instance, one or more device identifiers ("IDs") associated with different devices/components may be associated with, or mapped to, different environment IDs (or location IDs) of the environments. As a result, the remote computing resource(s) may be aware of the overall configuration of each environment, such as a determination of which devices/components are physically located within each environment. The remote computing resource(s) may also be aware of the functionality and capabilities of such devices/components.

The remote computing resource(s) may detect when a user enters an environment, such as a conference room. For instance, a user device of the user may detect a Bluetooth Low Energy (LE) beacon transmitted or broadcast by a device within the environment, which may allow the remote computing resource(s) to detect that a user device of the user is physically located within the environment. Detection of the user within the environment may also be determined based on facial recognition techniques applied to an image or video that is captured by a camera within the environment and that depicts the user. In other embodiments, the user may be detected based on a user action, such as the user checking in for a meeting or scanning a code using his/her user device, or calendar data associated with the user or the environment.

Upon determining that the user is within the environment, the remote computing resource(s) may identify the configuration of the environment, such as the devices/components within the environment, as well as the functionality/capabilities that these devices/components provide. Instead of, or in addition to, the user activating a device or component within the environment by way of a voice command, the remote computing resource(s) may generate and present an application that depicts the devices/components and their corresponding functionality/capabilities. For instance, upon the user opening the application on his/her user device, the application may depict selectable controls corresponding to the particular devices/components within that specific environment that the user can activate and control, such as video conferencing equipment, lights, a thermostat, blinds/curtains, and so on. The user may interact with the application (e.g., selecting a button or control) to cause certain operations within the environment to occur, such as initiating/joining a video conference, muting the call, adjusting the volume, turning on/off the lights within the environment, adjusting the brightness of the lights, controlling a thermostat in order to adjust the temperature within the environment, open/close blinds or curtains within the environment, etc.

The specific devices/components, and functionality/capability of the devices/components, that are depicted via the application may be based on a current device state of those devices/components (e.g., on, off, ongoing video conference, etc.). Upon the user selecting a selectable control via the application to perform an operation with respect to a device/component within the environment, corresponding data may be transmitted from the application/user device to the remote computing resource(s). The remote computing resource(s) may identify the requested operation, identify the particular device/component that is to perform the requested operation, and send instructions to the particular device/component in order to cause that device/component to perform the requested operation. The remote computing resource(s) may also monitor the current device states of devices/components within the environment, and cause the application to depict information that is consistent with those device states. As a result, the user, via the application, may be aware of which devices/components within the environment that he/she can activate or control, as well as the specific functionality/capabilities of those devices/components at that time.

FIG. 1 illustrates an example system 100 set in an environment 102, such as a conference room within a workplace. The system 100, and the environment 102 in particular, includes a user 104 and a corresponding user device 106, such as a mobile telephone, a tablet device, a laptop computer, and so on. The environment 102 may also include any number of electronic devices 108, such as a first device 108(1), a second device 108(2), and a third device 108(3). As shown, the first device 108(1) may be a voice-controlled device, the second device 108(2) may be a video conferencing device, possibly associated with a third party, and the third device 108(3) may be a display for displaying other participants of a video conference. For the purposes of this discussion, the device(s) 108 may include any type of device or component within the environment 102. Examples of the devices 108 may include video conferencing devices used to facilitate video conferences within the environment 102, and such video conferencing devices may include, or be associated with, displays, microphones, speakers, etc. The devices 108 or components may also include lights within the environment 102, a thermostat for maintaining/adjusting the temperature within the environment 102, blinds or curtains within the environment 102, or any other smart device that is configured to be communicatively coupled to other devices via one or more networks 110.

In some instances, the device(s) 108 (or components) may operate in conjunction with, or may otherwise utilize, computing resources 112 that are remote from the environment 102 and that are associated with a service provider 114. The device(s) 108 may also be communicatively coupled to, and/or controlled by, one or more third party computing resources 116 that are associated with a third party entity that is different than the service provider 114. The device(s) 108 may couple/communicate with, and receive instructions from, the remote computing resource(s) 112 and/or the third party computing resource(s) 116 via the network(s) 110. As illustrated, the remote computing resource(s) 112 may be implemented as one or more servers 118(1), 118(2), . . . , 118(P) and may, in some instances, form a portion of a network-accessible computing platform implemented as a computing infrastructure of processors, storage, software, data access, and so forth that is maintained and accessible via the network(s) 110, such as the Internet. The remote computing resource(s) 112 may or may not require end-user knowledge of the physical location and configuration of the system that delivers the services. Common expressions associated for these remote computing resource(s) 112 may include "on-demand computing", "software as a service (SaaS)", "platform computing", "network-accessible platform", "cloud services", "data centers", and so forth. Similarly, the third party computing resource(s) 116 may be implemented as one or more servers 120(1), 120(2), . . . , 120(P).

As will be described in additional detail with respect to FIGS. 2-8, the device(s) 108 (or components) may perform various operations within the environment 102, such as facilitating (e.g., initiating, joining, ending, etc.) a video conference, adjusting the volume of audio output by one or more speakers, muting a microphone, turning on/off and/or adjusting lights, adjusting the temperature, opening/closing blinds or curtains, and so on. In various embodiments, the service provider 114 may maintain a mapping between one or more environments 102 (e.g., conference rooms, hotel rooms, a residence, etc.) and the devices 108/components that are physically included in those environments 102. For instance, the remote computing resource(s) 112 may maintain, in a database or data structure, for example, associations between each environment 102 and the device(s) 108/components contained therein. As a result, the service provider 114 may be aware of the specific configuration associated with each environment 102, as well as the functionality and capabilities of each of the devices 108/components.

For the purpose of this discussion, the service provider 114 may be any number of servers, an entity, a platform, etc., that provides products and/or services to customers. For instance, the service provider 114 may offer products to customers via an electronic marketplace, a website, a mobile application, and so on. The service provider 114 may also provide data storage services to customers, as well as other entities, such as companies, corporations, and other businesses. In addition, the service provider 114 may provide one or more mechanisms that facilitate communication services between customers, such as e-mail services, chat services (e.g., a chat application), etc. The service provider 114 may further provide server-based and/or serverless-based computing services to customers, where the customers and/or the service provider 114 may provision, manage, and/or scale the servers in which their applications, services, software, etc., are hosted and running/executing. The service provider 114 may also provide video conferencing services to customers, and other device-related services to customers. For instance, devices 108 associated with the service provider 114 and/or other third party entities may allow customers to facilitate video conferences, perform operations using voice commands (e.g., turn on/off lights, adjust temperature, adjust volume, etc.), and so on.

For instance, using one or more devices 108 within the environment 102, the user 104 may facilitate a video conference with one or more remote locations (e.g., a different environment 102, room, building, etc.) in which other users 104 that are participants of the video conference are present/located. A video conference may involve the reception and transmission of audio-video signals between users 104/devices 108 at different locations, which may allow for video communications between users 104 at different locations in real-time (or near real-time). The device(s) 108 may include a microphone unit that includes at least one microphone (and potentially multiple microphones) and a speaker unit that includes at least one speaker to facilitate audio interactions with the user 104 and/or other users 104. The device(s) 108 may also include one or more cameras that capture video data that depicts at least a portion of the environment 102, as well as one or more displays that display remote locations associated with a video conference. However, in some instances, at least some of the device(s) 108 may be implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.).

In various embodiments, the device(s) 108 may communicatively couple to the network(s) 110 via wired technologies (e.g., wires, USB, fiber optic cable, etc.), wireless technologies (e.g., RF, cellular, satellite, Bluetooth, etc.), or other connection technologies. The network(s) 110 are representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The network(s) 110 may allow communication, and the exchange of information between, the device(s) 108, the remote computing resource(s) 112, and/or the third party computing resource(s) 116.

In some embodiments, the device(s) 108 may include one or more interfaces. The interfaces may include one or more wireless interfaces that are coupled to one or more antennas of the device(s) 108 in order to facilitate a wireless connection to the network(s) 110 (or any other network). The wireless interface(s) may implement one or more of various wireless technologies, such as Wi-Fi, Bluetooth, radio frequency (RF), and so on. The interface(s) may also include one or more device interfaces (e.g., USB, broadband connection, etc.), which may facilitate a wired connection to the network(s) 110 (or other networks), or a plug-in network device that communicates with other wireless networks. The device interface(s) may also allow the device(s) 108 to interact with, or couple to, other devices 108 within the environment 102. For instance, the interface(s) may enable communications between the components and/or devices 108 shown in the system 100 and/or with one or more other remote systems, as well as other networked devices. Such interface(s) may include one or more network interface controllers (NICs) or other types of transceiver devices to send and receive communications over the network(s) 110. Each of the interfaces may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the interfaces may include a wide area network (WAN) component to enable communication over a wide area network. In additional embodiments, one or more power units may further be provided to distribute power to the device(s) 108.

As will be described in additional detail with respect to FIG. 2, the remote computing resource(s) 112 and/or the service provider 114 may detect when the user 104 is within the environment 102 using one or more mechanisms. In one embodiment, one or more of the device(s) 108 may transmit or broadcast one or more Bluetooth LE beacons that are detected by the user device 106 of the user 104, which may be any type of mobile electronic device, such as a mobile telephone, a personal digital assistant, a tablet device, a laptop computer, an electronic book (eBook) reader device, a gaming console, and so on. The user device 106 may detect the Bluetooth LE beacons if the user device 106 is within a threshold distance from the device(s) 108 that are broadcasting the Bluetooth LE beacons. The user 104 may also be detected using one or more images or video that are captured by a device 108 within the environment 102 and that depict the user 104. Moreover, the user 104 may be determined to be within the environment 102 based on user interaction with the user device 106 and/or an application 122 that resides on the user device 106 and that is associated with the remote computing resource(s) 112 and the service provider 114. Regardless of the mechanism utilized, the service provider 114 may determine that one or more users 104 are within the environment 102, such as one or more users 104 entering a conference room for a meeting.

The remote computing resource(s) 112 and/or the service provider 114 may determine or detect a current device state of devices within the environment 102. For instance, the service provider 114 may determine whether various devices 108 are currently on, off, active, open, closed, and so on. The remote computing resource(s) 112 may receive or obtain the current device states of the devices 108 from the devices 108 themselves. For instance, the device(s) 108 may transmit data indicating a current device state at various periodic or recurring intervals, such as every hour, 15 minutes, 5 minutes, 1 minute, and so on.

As stated above, the application 122 associated with the service provider 114 may reside on user devices 106 of users 104 and may be used to activate and control devices 108 within the environment 102. Although an application 122 is described throughout, it is contemplated that the devices 108/components may be depicted via, and controlled using, a website or a different type of site. When the user 104 enters the environment 102 and opens/accesses the application 122 on his/her user device 106, the application 122 may depict the device(s) 108 and components within that particular environment 102, as well as the functionality and capabilities of those device(s) 108/components. Depiction of the device(s) 108/components and corresponding functionality/capabilities may be based on the mapping/association described above and the current device states of the devices 108/components. For instance, since the service provider 114 is aware of the configuration of (i.e., the device(s) 108/components included within) each environment 102, such as the environment 102 illustrated in FIG. 1, and the current state of those devices 108/components (e.g., on, off, active, open, closed, etc.), the service provider 114 may depict, via the application 122, which devices 108/components that the user 104 is able to activate/control, as well as which functionality/capabilities of those devices 108/components that the user 104 is able to activate/control. As a result, the application 122 may allow the user 104 to cause the devices 108/components within the environment 102 to perform various operations, possibly instead of having to utter one or more voice commands. Interaction with the application 122 may be less intrusive, disruptive, and/or distracting than uttering voice commands during a meeting or video conference.

Via the application 122, the user 104 may activate and control the devices 108/components, such as by pushing or actuating buttons or controls (also referred to herein as "selectable controls") depicted in the application 122. For instance, via the application 122, the user 104 may elect to initiate, join, or end a video conference, turn on/off lights, adjust the volume of speakers, mute a microphone, open/close curtains or blinds, adjust the temperature via a thermostat within the environment 102. Upon the user 104 indicating a selection of a selectable control to perform an operation associated with a device 108/component associated with the service provider 114, corresponding data may be transmitted by the application 122 to the remote computing resource(s) 112, which may then send instructions to the device 108/component in order to cause the device 108/component to perform that operation. If the device 108/component is associated with a third party entity, the application 122 may transmit data directly to the third party computing resource(s) 116 or the data may be transmitted to the third party computing resource(s) 116 via the remote computing resource(s) 112.

Upon the user 104 actuating one or more selectable controls via the application 122 for the purpose of causing certain operations to occur, the service provider 114 may continue to detect a current state of the device(s) 108/components, including the device 108/component that performed the requested operation. The remote computing resource(s) 112 may maintain the current device states of devices 108/components within the environment 102 and update the current device states based on the data/information received from the devices 108/components. The service provider 114 may then update the application 122 for users 104 within the environment 102 such that the application 122 dynamically depicts the devices 108/components that are available to activate/control, as well as the specific functionalities/capabilities of the devices 108/components that are available to activate or control at that particular time. Accordingly, the user 104 may utilize the application 122 to cause devices 108/components within the environment 102 to perform various actions/operations, where the devices 108/components and the corresponding functionality/capabilities are depicted in the application 122 in real-time (or near real-time).

As an illustrative example, when the user 104 walks into a conference room, the remote computing resource(s) 112 may detect when the user 104 is physically located within the conference room. The remote computing resource(s) 112 are aware of the configuration of the conference room, such as which devices 108/components are physically located in that conference room, and are aware of the current state of those devices 108/components. As a result, when the user 104 opens the application 122 via his/her user device 106, the user 104 may view, via the application 122, a customized user interface for that particular conference room. Instead of, or in addition to, using voice commands to cause certain operations to occur, the user 104 may instead interact with various selectable buttons or controls depicted within the application 122. For instance, when the user 104 opens the application 122, the user 104 will be presented with a dynamic set of selectable controls for performing various operations with respect to devices 108/components within the conference room. For instance, prior to a video conference, the application 122 may depict a selectable control for initiating or joining the video conference. However, during the video conference, the application 122 may depict different selectable controls for adjusting the volume, muting a microphone, adjusting a view of a display, and so on. Moreover, based on the specific configuration of that conference room and the current state of the devices 108/components within that conference room, the user interface may be different than other conference rooms that possibly contain a different combination of devices 108/components, different functionality/capabilities of devices 108/components, and/or different device states of those devices 108/components.

Figure 2:
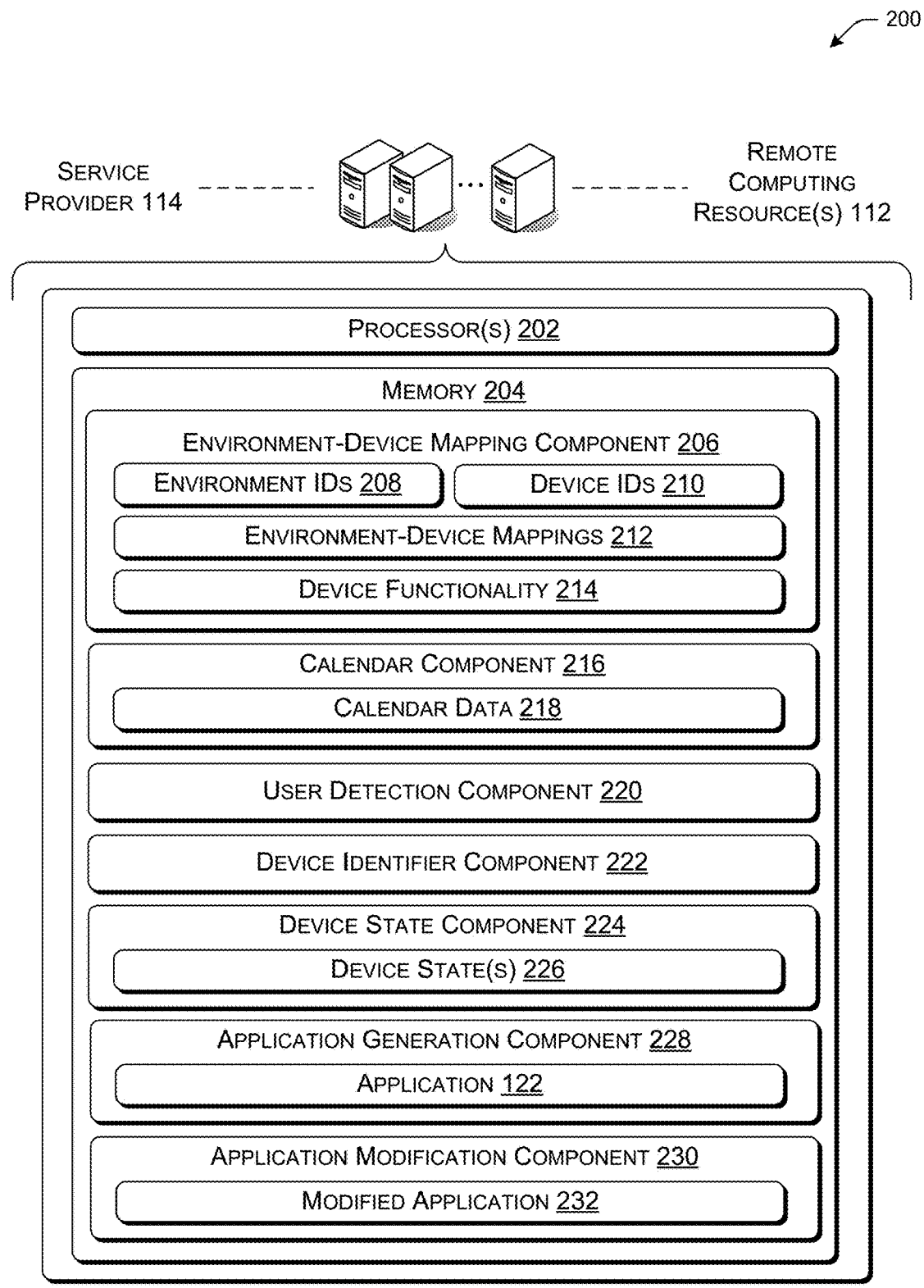
FIG. 2 illustrates an example diagram of remote computing resources that are configured to provide access to an application that allows users to activate and control devices and components within an environment.

FIG. 2 illustrates an example diagram 200 that depicts components of the remote computing resource(s) 112 that are associated with the service provider 114. As described herein, the service provider 114 may generate, maintain, and present an application 122 that allows users 104 within an environment 102 to activate and control devices 108/components within the environment 102, as well as the functionality and capabilities of those devices 108/components.

As illustrated in FIG. 2, the remote computing resource(s) 112 may include multiple components, such as one or more processors 202 and memory 204. The memory 204 may include computer-readable media ("CRM") and/or computer-readable storage media ("CRSM"), which may be any available physical media accessible by the processor 202 to execute instructions stored on the memory 204. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired data/information and that can be accessed by the processor(s) 202.

The memory 204 may include an environment-device mapping component 206, which may maintain one or more environment identifiers 208 (or location identifiers), one or more device identifiers 210, one or more environment-device mappings 212, and device functionality 214. In particular, each environment 102 may include an environment ID 208, which uniquely identifies that environment 102. The environment ID 208 for each environment 102 may be maintained in one or more databases or data structures associated with the remote computing resource(s) 112. In additional embodiments, each device 108/component that is physically located within an environment 102 may have a corresponding device ID 210 that uniquely identifies that device 108/component. Like the environment IDs 208, the device IDs 210 may be maintained in one or more databases or data structures associated with the remote computing resource(s) 112.

The environment-device mappings 212 may map or associate environments 102 and devices 108/components that are associated with those environments 102. In particular, for each environment 102, the service provider 114 may map or associate the environment ID 208 for that environment 102 with the device IDs 210 that correspond to the devices 108/components that are physically located in that environment 102. Such mappings and/or associations may be maintained in one or more databases or data structures associated with the remote computing resource(s) 112. As a result, the service provider 114 may maintain, and be aware of, the specific configuration of each environment 102. That is, the service provider 114 may determine the specific devices 108/components that are included within each environment 102. As stated herein, the environments 102 may include any location at which devices 108/components communicatively coupled to the remote computing resource(s) 112 are located, such as conference rooms, hotel rooms, a residence, and so on.

In addition, the service provider 114 may determine device functionality 214 associated with each device 108/component that are included within various environment 102. The device functionality 214 associated with a device 108/component may include the function/capabilities of the device 108/component, as well as the operations or actions that the device 108/component is configured to perform. Not only does the device functionality 214 include any type of operations that the devices 108/components are configured to perform, but the device functionality 214 may also specify different functionalities/capabilities of the devices 108/components at different times. For instance, video conferencing equipment may be configured to initiate, join, or end a video conference, adjust volume of a speaker, mute a microphone, adjust views of a display, and so on. A light may be configured to turn on and off, and the brightness of the light may also be adjusted. Blinds or curtains within and environment 102 may be configured to be opened or closed. In various embodiments, the device functionality 214 of a device 108/component is stored in association with the device ID 210 of that device 108/component. Some or all of these functionalities/capabilities will or will not be available to be controlled at different times based on the current device states of the devices 108/components. As a result, not only does the service provider 114 know which devices 108/components are included within each environment 102, but the service provider 114 is also aware of functionality, capabilities, operations, etc., that can be performed by such devices 108/components.

The memory 204 may also include a calendar component 216 that receives, determines, and/or maintains calendar data 218. The calendar data 218 may be based on one or more online/electronic calendars associated with an environment 102 and/or one or more users 104. For instance, the calendar data 218 may identify meetings (or video conferences) that are scheduled to occur within an environment 102, such as a conference room. Such calendar data 218 may include any type of information associated with the meeting, such as the location (e.g., the environment 102), a scheduled start time, a scheduled end time, call-in information, a topic or agenda for the meeting, participants of the meeting, relevant documents (electronic and/or physical), and environments 102 at which those participants will be attending the meeting, provided that one or more participants will be participating from at least one location remote from the environment 102. The participants of the meeting may be identified based on user IDs that uniquely identify those users 104. The user IDs may be associated with user profiles or user accounts associated with the users 104, which may be maintained by the service provider 114. The calendar data 218 may also correspond to online/electronic calendars of individual users 104, which may indicate meetings or events that the users 104 are scheduled to attend. As a result, the remote computing resource(s) 112 may be aware of meetings that are scheduled to occur in different environments 102, as well as meetings that individual users 104 are scheduled to attend.

The memory 204 of the remote computing resource(s) 112 may also include a user detection component 220 that is configured to detect or determine users 104 within the environment 102. In various embodiments, the environment 102 may include one or more devices 108 that are configured to transmit or broadcast Bluetooth LE beacons. Such devices 108 may be associated with, and communicatively coupled to, the remote computing resource(s) 112. For the purpose of this discussion, Bluetooth beacons may be hardware transmitters that either constitute a standalone device 108 or that are incorporated into a device 108 within the environment 102 that is associated with the service provider 114. The Bluetooth beacons may be considered to be a class of Bluetooth low energy (LE) devices that broadcast their identifier to nearby portable electronic devices, such as user devices 106 of users 104 that are within, or that are in close proximity to (e.g., within a threshold distance from), the environment 102, and the device 108 broadcasting the beacon in particular. More particularly, the Bluetooth beacons may use Bluetooth low energy proximity sensing to transmit a universally unique identifier that is detected by a compatible application (e.g., application 122) or operating system. In some embodiments, the identifier and one or more bytes sent with the identifier may be used to determine a physical location of a user device 106, track users 104, or trigger a location-based action on the user device 106. The Bluetooth beacons may constitute a one-way transmitter to the receiving user device 106, and may need a specific application 122 installed on the user device 106 in order to interact with the beacons.

When a user 104 enters the environment 102, his/her user device 106 may detect or receive the Bluetooth LE beacons, provided that Bluetooth is currently enabled on the user device 106. The application 122 may detect the Bluetooth LE beacon(s) and transmit such data to the remote computing resource(s) 112 and/or the user device 106 may transmit such data to the remote computing resource(s) 112. Either way, the service provider 114 may determine the current physical location of the user device 106 of the user 104 and, therefore, determine that the user 104 is within the environment 102.

In other embodiments, the user detection component 220 may determine that the user 104 is within the environment 102 based on an image or video that is captured by a camera associated with one of the devices 108 within the environment 102, where the image/video depicts at least a portion of the user 104. In some embodiments, one or more facial detection or facial recognition technologies may be applied to the image/video in order to determine the identity of the user 104. Determining the identity of the user 104 may be based on a comparison of a face of the user 104 depicted in the captured image/video and a stored image/video that is maintained by the remote computing resource(s) 112 and that depicts the face of the user 104. The image/video may also depict a badge, nametag, identification, etc. of the user 104, and the identity of the user 104 may be determined based on this information. For instance, a badge number or name may be compared to a database of employees that includes names and or employee IDs.

Detection of the user 104 within the environment 102 may also be based on user interaction with the user device 106 and/or the application 122. For example, via the application 122, the user 104 may check in to the environment 102 and/or indicate that he/she is currently attending a meeting. In the latter scenario, the service provider 114 may determine the environment 102 at which the meeting is scheduled to occur based on the calendar data 218. Furthermore, the user 104 may scan a code within the environment 102 (e.g., on the door, the door frame, the table, etc.) using a scanner of the user device 106, such as by scanning a Quick Response ("QR") code using a QR reader of the user device 106. Radio-frequency identification ("RFID") techniques may also be utilized to detect that the user 104 is within the environment 102. For instance, an RFID chip may be located somewhere within the environment 102 (e.g., on or next to a conference table) and the user device 106 of the user 104 may include an RFID reader. The user 104 may also be detected to be within the environment 102 based on the calendar data 218 generally. For example, if a meeting is scheduled to occur within an environment 102 at a particular time, the service provider 114 may infer that the participants that are schedule to attend the meeting within that environment 102 are currently within, or will be within, that environment 102.

The memory 104 of the remote computing resource(s) 112 may also include a device identifier component 222. Upon determining that the user 104 is within the environment 102, the service provider 114 may determine or identify the devices 108 and/or components that are physically located within that environment 102. The service provider 114 may determine such devices 108/components based on the environment-device mappings 212. For instance, the service provider 114 may identify the environment ID 208 for the environment 102, and then utilize the environment-device mappings 212 to identify the device IDs 210 of devices 108 and/or components that are within the environment 102. The service provider 114 may also determine the device functionality 214 of each of the identified devices 108/components. As a result, the service provider 114 may determine the configuration of the environment 102, as well as the functionality and capabilities of the identified devices 108/components.

A device state component 224 maintained in the memory 204 may determine a device state 226 associated with devices 108/components within different environments 102. More particularly, with respect to an environment 102 at which a user 104 is determined to be located/present, the device state component 224 may determine a current device state 226 of the different devices 108/components within that environment 102. In various embodiments, devices 108 within the environment 102 that are associated with the service provider 114 may transmit their current device states 226 at the request of the remote computing resource(s) 112, or such devices 108 may transmit their device states 226 on a recurring or periodic basis (to the remote computing resource(s) 112, for example). For third party devices 108 that are within the environment 102, such devices 108 may transmit their current device states 226 to the third party computing resource(s) 116, which may then transmit the device states 226 for the third party devices 108 to the remote computing resource(s) 112. The remote computing resource(s) 112 may maintain the current device states 226 of the devices 108 and refresh the current device states 226 on a recurring/periodic basis. Examples of current device states 226 include a video conferencing device 108 being on, off, and/or active, lights being on or off, as well as a brightness level of the lights, a current temperature of the environment 102 monitored by a thermostat, blinds or curtains being open, closed, or partially open/closed, a volume level of speakers, and, with respect to a display, an extent to which a camera is zoomed in/out, a type of view (e.g., a single view, side-by-side or top/bottom views, a quadrant of four views, etc.), a brightness level, a contrast level, and so on.

An application generation component 228 may generate, maintain, update, and/or customize the application 122 that is presented to users 104 within the environment 102. In various embodiments, the application 122 may include a user interface that depicts devices 108/components within the environment 102 at which the user 104 is located, as well as the functions, capabilities, operations, etc., that the user 104 is authorized to control. In some embodiments, the user 104 may only be authorized to activate or control some, but not all, of the devices 108/components and/or functionality or capabilities of those devices 108/components. The application 122 may depict all, some, or none of the devices 108/components within the environment 102 based on the device state 226 of the devices 108/components. Moreover, the functionality and/or capabilities of the devices 108/components (e.g., the operations that the devices 108/components are currently configured to perform) may also be based on the device state 226 of the devices 108/components. Accordingly, the service provider 114 may dynamically determine which devices 108/components and corresponding functions/capabilities the user 104 is allowed to activate and control at a particular time. For instance, if current device state 226 of lights within the environment 102 indicates that the lights are turned off, the application 112 may depict a selectable control that allows the user 104 to turn on the lights. However, if the current device state 226 of the lights within the environment 102 indicates that the lights are turned on, the application 112 may depict a first selectable control that allows the user 104 to turn off the lights and a second selectable control that allows the user 104 to increase or decrease a brightness level of the lights. The user interface of the application 122 may include one or more selectable controls or selectable options (e.g., buttons, sliders, etc.) that allow the user 104 to activate and control the devices 108/components.

Accordingly, once it is determined that a user 104 is within a particular environment 102, the service provider 114 may determine the devices 108/components within that environment 102, including the functionality and capabilities of those devices 108/components. The service provider 114 may also determine the current device state 226 of these devices 108/components (e.g., on, off, active, open, closed, etc.). This information may then be displayed to the user 104 via the application 122 when the user 104 opens or accesses the application 122 via his/her user device 106. The user 104 may cause the devices 108 and/or components to perform various operations by actuating selectable controls/options via the application 122. Upon determining that the user 104 selected a particular device 108/component (e.g., video conferencing device 108), the application 122 may display further information specific to that device 108/component, such as selectable controls to initiate, join, or end a video conference, mute a microphone, adjust volume, adjust display settings, etc.

In some embodiments, certain functions, capabilities, operations, etc. associated with a device 108/component are displayed via the application 122 once the device 108/component is activated or powered on. For instance, certain operations associated with video conferencing equipment are only presented via the application 122 once a video conference is initiated, or once a user 104 joins the video conference. Prior to initiation of the video conference, the application 122 may only depict visual selectable controls associated with initiating or joining the video conference. However, once the video conference has begun, the application 122 may depict multiple selectable controls associated with the video conference. For instance, and as described above, the application 122 may depict selectable controls to allow the user 104 to mute one or more microphones, adjust the volume of speakers, end the video conference, adjust a view of a display that is displaying at least a portion of the video conference, and so on.

Similarly, different functions, capabilities, operations, etc., associated with a device 108/component are only depicted via the application 122 when the device 108/component is in a particular device state 226. For instance, with respect to lights within an environment 102 that can be controlled by the user 104 via the application 122, if the device state 226 of the lights indicates that the lights are currently off, the application 122 may only depict a selectable control to turn on the lights. However, once the lights are turned on, the application 122 may depict different selectable controls associated with the lights, such as a first selectable control to turn off the lights and a second selectable control to adjust a brightness of the lights. Once the lights are turned off, the application 122 may then depict a selectable control to turn on the lights.

The memory 104 of the remote computing resource(s) 112 may also include an application modification component 230, which may generate and/or present a modified application 232, such as by updating or modifying the application 122. Via the application 122 presented via the user device 106 of the user 104, the user 104 may select a selectable control to perform a function or operation associated with a device 108/component within the environment 102. Data representative of that selection is then transmitted by the application 122 and/or the user device 106 to the remote computing resource(s) 112. Provided that the device 108/component is associated with the service provider 114, meaning that the device 108 is provided by the service provider 114 or that device 108/component utilizes services provided by the service provider 114, the service provider 114 may cause the function/operation to occur. For instance, the remote computing resource(s) 112 may transmit, to the device 108/component, one or more instructions to perform the function/operation, which, in turn, causes the device 108/component to perform that function/operation. Based on that function/operation, the remote computing resource(s) 112 may update or maintain the new current device state 226 of that device 108/component. Based on the updated device state 226, the service provider 114 may modify or update the application 122 to depict the functions/operations that the device 108/component is configured to perform at that time.

As an illustrative example, assume that the user 104 has selected a control via the application 122 requesting that a video conferencing device 108 initiate a video conference. Data representative of that request is transmitted from the application 122 to the remote computing resource(s) 112. Based on that data, the remote computing resource(s) 112 may send one or more instructions to the devices 108 within the environment 102 that are configured to facilitate/initiate a video conference. For instance, the remote computing resource(s) 112 may send one or more instructions causing a video camera to begin capturing video data within the environment 102, a microphone to begin capturing audio data within the environment 102, a display to begin displaying video data that visually depicts other participants of the video conference, a speaker to begin outputting audio data that corresponds to one or more environments 102 in which the other participants are located, and a device to initiate a call associated with the video conference. The remote computing resource(s) 112 may then update the current device states 226 for such devices 108, indicating that a video conference has been initiated and is active/ongoing. The remote computing resource(s) 112 may also update the application 122 based on the updated device state(s) 226, resulting in a modified application 232 that is presented to the user 104. For instance, instead of a selectable control to initiate or join a video conference, the modified application 232 may instead depict selectable controls to end the video conference, to mute a microphone, to adjust the volume of the speaker, to adjust a view of the display, and so on. Such selectable controls apply to the current device state 226 of the devices 108 that are facilitating the video conference. As a result, the application 122 is dynamically updated based on the current status of devices 108/components in order to depict devices 108/components and corresponding functions/operations that the user 104 is allowed to activate and/or control at that particular time.

In other embodiments, provided that the device 108/component is associated with a third party entity that is different than the remote computing resource(s) 112, the data representative of the requested function/operation may be transmitted directly to the third party computing resource(s) 116, which may then cause the third party device 108/component to perform the requested operation/function. The remote computing resource(s) 112 may then detect or otherwise obtain the current device state 226 from that device 108/component. In other embodiments, the data representative of the requested function/operation may be transmitted to the remote computing resource(s) 112, which then may transmit the data to the third party computing resource(s) 116. The third party computing resource(s) 116 may cause the third party device 108/component to perform the requested operation/function, and then send a confirmation to the remote computing resource(s) 112 when the requested operation/function has been performed. Upon receiving the confirmation, the remote computing resource(s) 112 may update the current device state 226 of the third party device 108/component and update the application 122 based on that updated device state 226.

As an illustrative example, assume that a third party device 108 within the environment 102 is a smart device such as lights. Provided that the lights are currently on, the application 122 may depict selectable controls to turn off the lights or to adjust the brightness level of the lights. Provided that the user 104 selected a control (e.g., a slider) to dim the lights, data representative of that requested operation is transmitted to the remote computing resource(s) 112. The remote computing resource(s) 112 may identify the requested operation and call the third party computing resource(s) 116 that are associated with the lights. The third party computing resource(s) 116 cause the lights to be dimmed (e.g., decrease brightness), and then transmits data to the remote computing resource(s) 112 confirming that the requested operation has in fact been performed (e.g., the lights within the environment 102 have been dimmed). The remote computing resource(s) 112 may adjust the device state 226 of the lights, such as by indicating that the lights have been decreased from a first brightness level/value to a second brightness level/value that is less than the first brightness level/value, or vice versa. The remote computing resource(s) 112 may then update the application 122 to indicate the current brightness level/value of the lights, resulting in a modified application 232 that is presented to the user 104 via his/her user device 106. For instance, the remote computing resource(s) 112 may cause the control/slider to indicate the current brightness level/value of the lights. This process May be repeated if the user 104 continues to adjust the brightness of the lights via the application 122, or if the user 104 elects to turn off the lights via the application 122.

As stated herein, the particular set of selectable controls associated with a device 108/component that are depicted within the application may be based on the current device state 226 of that device 108/component. In some instances, the depicted set of selectable controls may be based on a user selection of one of the selectable controls via the application 122. However, in other embodiments, the device state 226 of the device 108/component may be updated based on user actions that are not associated with the application 122. For instance, the user 104 may utter a voice command to cause a device 108/component to perform a requested operation, or the user 108 may interact with a remote control, a light switch, a thermostat, etc., to cause requested operations to occur. Based on that requested operation, the service provider 114 may update the device state 226 of that device 108/component, and may cause the application 122 to depict the appropriate set of selectable controls based on the updated device state 226. As an illustrative example, the user 104 may utter a voice command to initiate/join a video conference. The voice command may be interpreted/processed by the remote computing resource(s) 112 in order to cause one or more video conferencing device(s) 108 to initiate or join the video conference. The service provider 102 may then cause the selectable controls that are associated with the video conferencing device(s) 108 and that are consistent with the updated device state 226 (e.g., ongoing video conference) to be depicted via the application 122. Such selectable controls may include ending the video conference, muting a microphone, adjusting a display, adjusting the volume, etc.

In some embodiments, the devices 108/components and/or the selectable controls that are depicted and dynamically updated within the application 122 may be based on a role of the user, an employment of the user 104, and/or one or more permissions assigned to the user 104. That is, the particular set of selectable controls that are presented to the user, and thus the operations that the user 104 is authorized to perform with respect to the devices 108/components within an environment 102, may be based on the role of the user 104, an employment of the user 104, and/or permissions assigned to the user 104. For the purposes of this discussion, the role, employment, permissions, etc., associated with a user 104 may include, but are not limited to, an employer of the user 104, an employment status of the user 104 (e.g., full-time, part-time, contractor, vendor, etc.), a level or type of position held by the user 104 (e.g., an entry level position, information technology (IT) administrator, executive, vice president, board member, etc.), and so on.

For instance, for a typical employee of an employer, the application 122 may identify devices 108/components within an environment 102, and dynamically depict a set selectable controls that correspond to operations the devices 108/component are configured to perform and that may be selected by the employee. On the other hand, an IT administrator of the employer may have access to various types of information that are not available to other employees, such as being able to view device usage statistics associated with the environment 102, to troubleshoot devices 108/components within the environment 102 (e.g., video conferencing connectivity problems), to reconfigure or otherwise manage the devices 108/components, and/or to initiate the rediscovery of devices 108/components within the environment 102 that are communicatively coupled to the remote computing resource(s) 112 and/or the third party computing resource(s) 116 via the network(s) 110. Based on the role or status of the employee and the IT administrator, such information may be depicted via the application 122 residing on the user device 106 of the IT administrator, but may not be available to the employee.

In additional embodiments, one or more permissions granted or assigned to a user 104 may be temporary, meaning that the user 104 may only be able to activate or control devices 108/components within an environment 102 during a particular period of time or until a specified time. For instance, a user 104 attending a meeting within an environment 102 (e.g., a conference room) may only be authorized to control devices 108/components within the environment 102 during a time period that corresponds to the meeting (e.g., 3:00-4:00 pm). The time period may begin at a scheduled start time for the meeting (or shortly before the scheduled start time) and conclude at a scheduled end time for the meeting (or afterwards if the meeting continues past the scheduled end time). During that time period, or up until a particular time, selectable controls associated with the devices 108/components may be depicted within the application 122. However, outside of that time period, or after that particular time, the user 104 would no longer be able to control those devices 108/components. The selectable controls may no longer be visible within the application 122, or the user 104 may not be able to select one or more of the selectable controls. In another example, assume that the environment 102 is a hotel room and the user 104 is a hotel guest staying in that hotel room. During a time period that corresponds to a check-in time and a check-out time, the user 104 may be able to control lights, a television, etc. within the hotel room via the application 122. However, either before the user 104 checks into the hotel or after the user 104 checks out, the user 104 may no longer be authorized to control those devices 108/components within the hotel room.

In other embodiments, the remote computing resource(s) 112 may maintain preferences of users 104 or groups of users 104, and/or a particular user 104 may be aware of the preferences of other users 104, which are possibly within the same group/team as the first user 104. As a result, the manner in which devices 108/components within an environment 102 are set up or controlled may be personalized based on these preferences. For instance, assume that a first user 104 knows that one or more second users 104 (e.g., a group or team) prefers a certain setup with respect to meetings or video conferences in a conference room. In particular, the one or more second users 104 may prefer a split screen display associated with a video conference (as opposed to a single view), may prefer that the lights be dimmed (as opposed to being bright), and may prefer that a particular software/program be used (or not be used) to present information during the meeting/video conference. In this scenario, the first user 104 may control the settings of such devices 108/components via the application 122 on behalf of the second user(s) 104, which may be attending the same meeting within the conference room. Or the second user(s) 104 may be participating in the same meeting in a remote conference room. The preferences described above may also correspond to secondary users 104 that are not within the same group/team as the first user 104. For instance, if the first user 104 knows that a visiting user 104 will be attending a meeting/video conference in which the team/group of the first user 104 is participating, such preferences may or may not be considered when setting up and/or controlling the devices 108/components within the conference room using the application 122.

Figure 3:
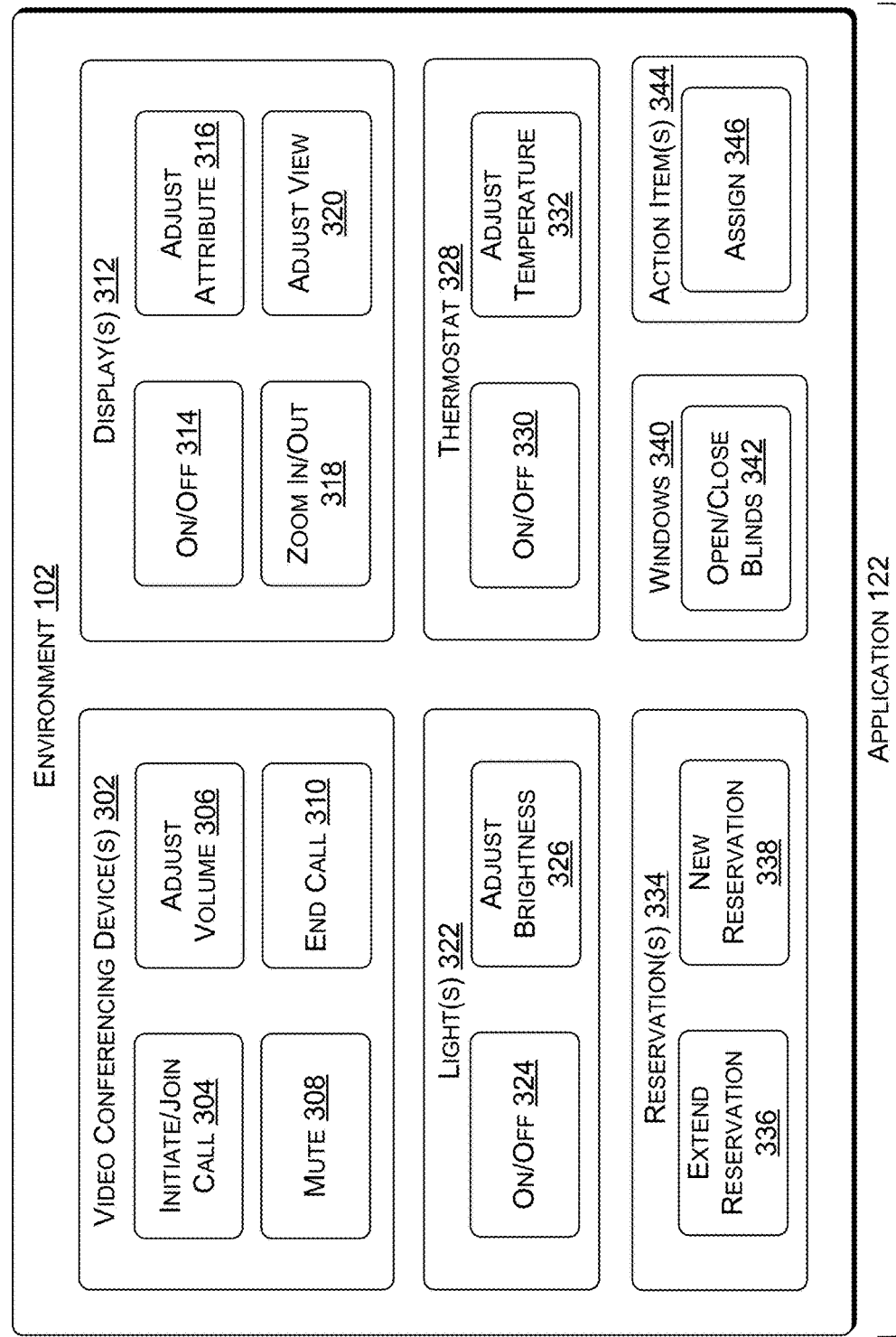
FIG. 3 illustrates an example diagram that depicts an application that allows users to activate and control devices and components within an environment.

FIG. 3 illustrates an example diagram 300 of an application 122 that is presented via a user device 106 of a user 104 and that depicts one or more device(s) 108/components within an environment 102 at which the user 104 is located, as well as functionality and capabilities of the device(s) 108/components. In particular, the application 122 may be represented as a user interface that includes multiple selectable options or controls. The selectable options/controls may allow a user 104 to activate and control various devices 108/components within the environment 102 at which the user 104 is determined to be located. Although multiple device(s) 108/components are depicted within the application 122, only a portion of the devices 108/components may be depicted at a particular point in time based on the particular environment 102 at which the user 104 is located. That is, the devices 108/components depicted in the application 122 will correspond to the specific devices 108/components that are physically located in that environment 102. Moreover, the devices 108/components that are depicted within the application 122, as well as the functions/operations of those devices 108/components, may be based on the device states 226 of those devices 108/components. As a result, different combinations of the selectable controls illustrated in FIG. 3 may be depicted within the application 122 at different times.

The application 122 may identify the environment 102 at which the user 104 is currently located, which may be the environment ID 208 of that environment 102, such as the name or number of a conference room, the name of a room in a residence (e.g. living room, office, etc.), and so on. Moreover, various devices 108/components are depicted in the application 122. For instance, video conference device(s) 302 are shown in the application 122, and the selectable controls may include initiate/join call 304, adjust volume 306, mute 308, and end call 310. As stated above, some or all of these selectable controls may be displayed based on the device state 226 of the video conferencing device(s) 302. For instance, if a video conference is not currently active/ongoing, a selectable option to initiate/join call 304 may only be depicted. That is, if a video conference has yet to begin, it is unlikely that the user 104 would desire to adjust the volume 306 or mute 308 a microphone, and the user 104 would be unable to end a call 310 that has not yet begun. The initiate/join call 304 selectable control may include an entry for a meeting code or identifier that is to be used to initiate or join the video conference. In some embodiments, additional information, such as information relating to upcoming meetings/video conferences (e.g., start time, end time, participants, etc.), may also be depicted.

Once the video conferencing device(s) 302 have initiated the video conference, the application 122 may dynamically display additional and/or different selectable controls. For instance, since the video conference has begun, it makes little to no sense for the user 104 to initiate/join the call 304. Instead, the application 122 may depict selectable controls to adjust the volume 306 of one or more speakers, mute 308 a microphone, or end the call 310. This portion of the application 122 may also display information about the current video conference, such as relevant documents, a list of participants, an amount of time since the video conference was initiated, and so on.

Although it may be part of the video conferencing device(s) 302 portion of the application 122, the application 122 may also depict selectable controls associated with one or more displays 312, such as a display 312 that is configured to be used in conjunction with a video conference. Provided that a current device state 226 of the display 312 indicates that the display 312 is turned off, the application 122 may only depict a selectable control to turn on 314 the display 312. However, if the device state 226 indicates that the display 312 is on, different selectable controls may be depicted. For instance, a selectable control to turn the display off 314 may be depicted. Further, the application 122 may depict selectable controls to adjust an attribute 316 of the display 312 (e.g., adjust brightness, adjust contrast, etc.), zoom in/out 318, and adjust a view 318 of the display 312. With respect to the selectable control to adjust a view 320 of the display 312, this may include sharing a view with other environments 102 at which participants of the video conference are located, or adjusting the configuration and/or number of views displayed via the display 312 (e.g., a single view, two views, four views, etc.).

The application 122 may also depict selectable controls associated with lights 322 within the environment 102, where the lights are communicatively coupled to the remote computing resource(s) 112. Provided that the lights are currently turned off, the application 122 may include a selectable control to turn on 324 the lights. However, if the lights 322 are currently turned on, the application 122 may display different selectable controls, such as a first selectable control to turn off 324 the lights 322 and a second selectable control to adjust a brightness 326 level of the lights 322. For example, the selectable control may be a bar, slider, or dial that allows the user 104 to select the desired level of brightness of the lights 322.

Furthermore, the application 122 may include selectable controls associated with a thermostat 328 within the environment 102 that controls temperature settings within the environment 102. For instance, the selectable controls may include a selectable control to turn on 330 the cooling/heat (provided that the thermostat 320 is off/inactive) or turn off 330 the heat (provided that the thermostat is on/active). If the thermostat 328 is currently causing the environment 102 to be heated or cooled, the application 122 may depict a selectable control that allows the user 104 to adjust the temperature 332 within the environment 102. This selectable control may also include a bar, slider, or dial that allows the user 104 to select the appropriate temperature for the environment 102.

The application 122 may also include selectable controls associated with the reservation 334 or scheduling of the environment 102, and possibly different environments 102. In addition to displaying information associated with a current meeting or video conference, the application 122 may include selectable controls that allow the user 104 to extend the reservation 334 for the environment 102, which may be appropriate in a scenario where the meeting/video conference is going to run past the scheduled end time. If the environment 102 is not reserved afterwards, the user 104 may select a control to extend the amount of time reserved for the room (e.g., extend reservation 336). In other embodiments, the application 122 may include a selectable control that allows the user 104 to schedule a new reservation 338 for a different environment 102. For instance, if a meeting/video conference is about to run over, or has already run over, and the environment 102 at which the meeting/video conference is occurring is not available after a schedule end time of the meeting/video conference, the application 122 may display other environments 102 (e.g., conference rooms) that are available, including environments 102 that are in close proximity to the current environment 102. In other embodiments, the user 104 may simply enter an environment 102, and the application 122 may indicate whether that environment 102 is available to reserve. If so, the user 104 may select the control to reserve the environment 102 for that time.

In certain embodiments, the application 122 may include selectable controls relating to windows 340 within the environment 102 that are communicatively coupled to the remote computing resource(s) 112, such as selectable controls that allow the user 104 to open or close blinds or curtains 342. In particular, if the blinds/curtains 342 are open, the application 122 may display a selectable control to close or partially close the blinds/curtains 342. On the other hand, if the device state 226 of the blinds/curtains 342 indicates that the blinds/curtains 342 are currently closed, the selectable control may allow the user 104 to open, or at least partially open, the blinds/curtains 342. If the blinds/curtains 342 are partially open, the application 122 may include selectable controls that allow the user 104 to open the blinds/curtains 342, close the blinds/curtains 342, further open the blinds/curtains 342 (but not open the blinds/curtains 342 entirely), and/or further close the blinds/curtains 342 (but not close the blinds/curtains 342 entirely).

The application 122 may also allow users 104 that are participating in a meeting or video conference to determine action items 344 and assign 346 the action items to participants of the meeting/video conference, or possibly other users 104. For instance, selection of a selectable control depicted in the application 122 may cause a message (e.g., an e-mail message, a text message, a chat message, etc.) to be sent to a user 104 in which an action item 344 or task was assigned. The action items 344 or tasks may be assigned 346 either during or after the meeting/video conference. Moreover, once an action item 344 or task is assigned 346 to a particular user 104, the action item 344/task may appear in the application 122 that resides on the user device 106 of that user 104.

Although a particular configuration of device(s) 108/components and selectable controls are depicted in the application 122 illustrated in FIG. 3, it is contemplated that any configuration may be used or implemented. Moreover, upon the user 104 selecting a particular device 108/component, the application 122 may show additional information associated with that device 108/component, and possibly instead of the other devices 108/components. For instance, provided that the user 104 selected the portion of the application 122 that corresponds to the video conferencing device(s) 302, the application 122 may depict an expanded view of the video conferencing device(s), including one or more selectable controls associated therewith, and at the same time hide the other devices 108/components that the user 104 is able to control via the application 122.

In some embodiments, the remote computing resource(s) 112 may determine that a user 104 is no longer within the environment 102. For instance, the user device 106/application 122 may no longer detect the Bluetooth LE beacon(s) that are transmit/broadcast by a device 108 within the environment 102, or may determine that the user device 106 of the user 104 is equal to or greater than a threshold distance from such a device 108. The remote computing resource(s) 112 may also infer that the user 104 is no longer within the environment 102 if a meeting/video conference in which the user 104 was participating in has ended (e.g., the current time is after the scheduled end time for the meeting/video conference). In those scenarios, the service provider 114 may cease displaying the devices 108/components that are within that environment 102, or may prevent the user 104 from accessing the application 122. If it is determined that the user 104 is not likely to be present within the environment 102, the service provider 114 may power down various devices 108/components, such as turning off a display 312, powering down a projector, collapsing or rolling up a display screen, turning off or dimming the lights 322, opening the blinds or curtains 342, and so on. The service provider 102 may also cause the video conferencing devices 302 to end the video conference, inquire whether the user 104 desires to end the video conference, or inquire whether the user 104 would like to end the call 310 via the application 122. The service provider 114 may have various routines that define actions/operations that are to occur once a user 104 enters the environment 102, initiates a video conference, leaves the environment 102 ends a meeting/video conference, etc.

Figure 4A:
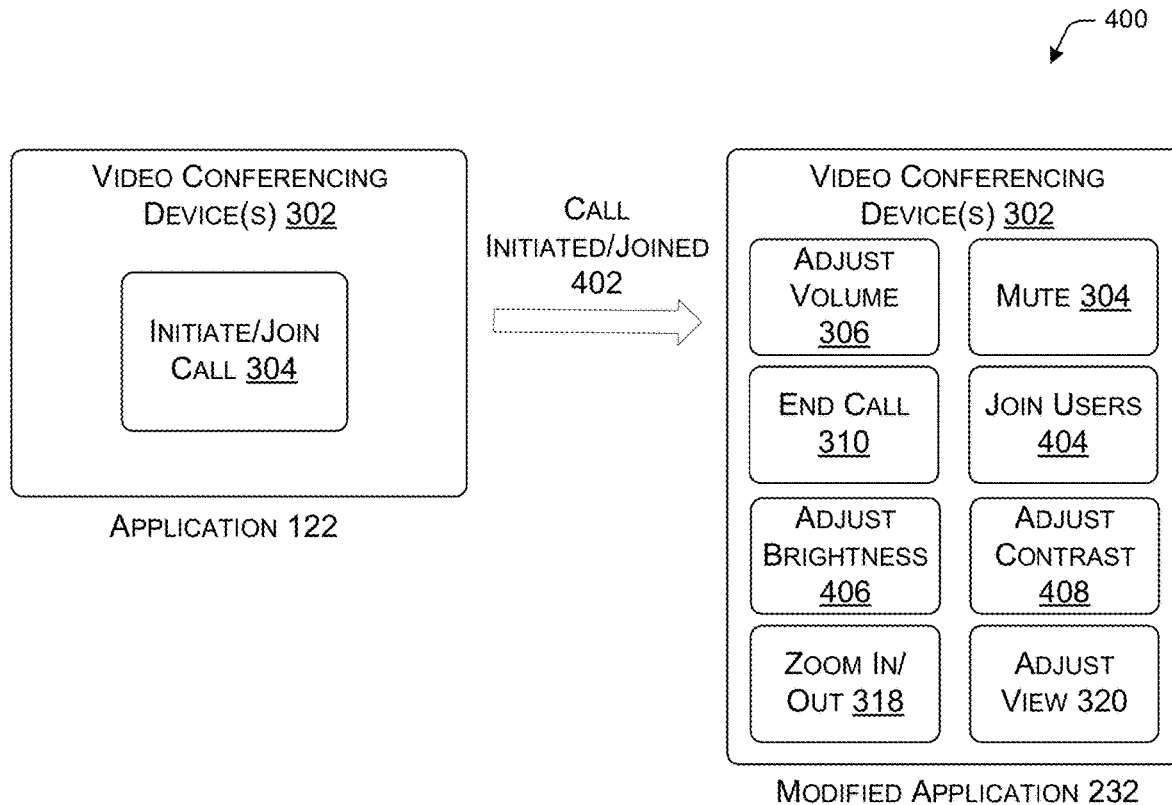
FIG. 4A illustrates an example diagram of an application that depicts one or more video conferencing devices within an environment that a user may activate and control using the application based on a current device state of the video conferencing device(s).

FIG. 4A illustrates an example diagram 400 of an application 122 that depicts selectable controls associated with a device 108/component (e.g., one or more video conferencing devices 302) based on a device state 226 of the device 108/component. In particular, the diagram 400 illustrates different selectable controls that are depicted within the application 122, and that are presented to a user 104 that is currently within an environment 102 at which the video conferencing device(s) 302 are located, based on the video conferencing device(s) 302 being off/inactive and on/active at different times.

In certain embodiments, the service provider 114 may determine or detect that a user 104 has entered, or is within, an environment 102, such as a conference room. Based on an environment-device mapping 212 associated with that environment 102, the service provider 114 may determine which devices 108 and/or components are physically located within that environment 102. The service provider 114 may also determine a device state 226 associated with each of the devices 108/components. For the purposes of FIG. 4A, assume that at least one of the devices 108/components within the environment 102 are one or more video conferencing devices 302. At a first time, the device state 226 of the video conferencing device(s) 302 may be an off state, such that there is not an ongoing meeting/video conference. As a result, the selectable control depicted within the application 122 may be to initiate/join call 304. The user 104 may select that control in order to initiate or join a meeting or video conference. FIG. 4A further illustrates that the user 104 has selected the initiate/join call 304 selectable control in order to initiate or join a video conference (e.g., call initiated/joined 402).

Upon determining that the user 104 has selected a control to initiate or join a video conference via the application 122, the service provider 114 may update a current device state 226 of the video conferencing device(s) 302. As a result of the change in device state 226 of the video conferencing device(s) 302, the service provider 114 may dynamically adjust which selectable controls associated with the video conferencing device(s) 302 are depicted within the application 122. Since the video conference has been initiated, there is little sense in presenting a selectable control to initiate/join a call 304. Instead, the service provider 114 may identify and present selectable controls that are relevant and apply to an ongoing video conference, which may result in a modified application 232 that is presented to the user 104 via his/her user device 106.

The selectable controls that are depicted within the modified application 232 and that are presented to the user 104 may include a selectable control to adjust the volume 306 of one or more speakers associated with the video conferencing device(s) 302. The modified application 232 may also include a selectable control to mute 304 one or more microphones associated with the video conferencing device(s) 302, as well as a selectable control to end the call 310. Moreover, the modified application 232 may include a selectable control to join users 104 to the meeting or video conference. For instance, a user 104 that is currently participating in the meeting/video conference may invite others to join the meeting/video conference. The modified application 232 may also depict selectable controls to adjust a brightness 406 level or adjust a contrast 408 level of a display 312 associated with the video conferencing device(s) 302. In addition, the modified application 232 may depict a selectable control to zoom in/out 318 with respect to a camera associated with the video conferencing device(s) 302, as well as a selectable control to adjust a view 320 of a display 312 associated with the video conferencing device(s) 302. As a result, the selectable controls that represent operations that can be performed with respect to a device 108 within the environment 102 may be based on previous requested operations of the user 104 and a current device state 226 of the device 108.

Figure 4B:
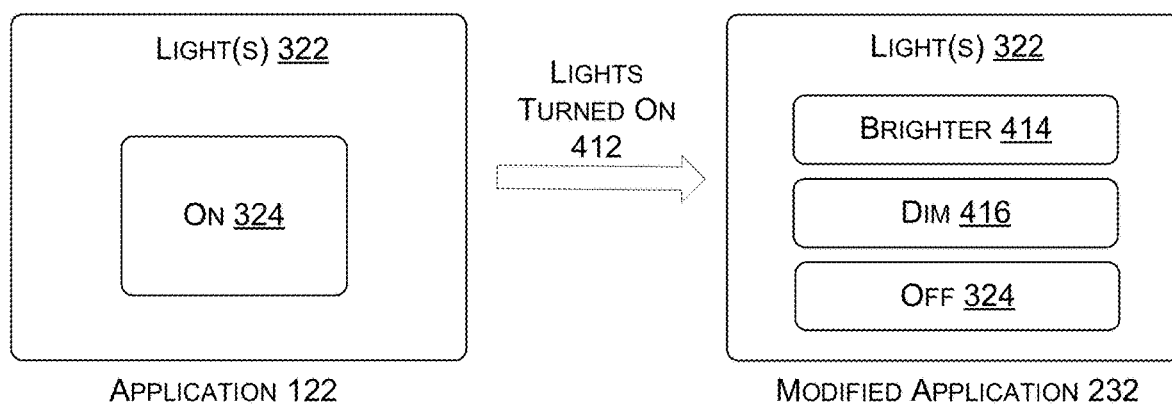
FIG. 4B illustrates an example diagram of an application that depicts one or more lights within an environment that a user may activate and control using the application based on a current device state of the light(s).

FIG. 4B illustrates an example diagram 410 of an application 122 that depicts selectable controls associated with a device 108/component (e.g., one or more lights 322) based on a device state 226 of the device 108/component. In particular, the diagram 410 illustrates different selectable controls that are depicted within the application 122, and that are presented to a user 104 that is currently within an environment 102 at which the light(s) 322 are located, based on the light(s) 322 being on and off at different times.

In certain embodiments, the service provider 114 may determine or detect that a user 104 has entered, or is within, an environment 102, such as a conference room. Based on an environment-device mapping 212 associated with that environment 102, the service provider 114 may determine which devices 108 and/or components are physically located within that environment 102. The service provider 114 may also determine a device state 226 associated with each of the devices 108/components. For the purposes of FIG. 4B, assume that at least one of the devices 108/components within the environment 102 are one or more lights 322 that are communicatively coupled to the remote computing resource(s) 112 and/or the third party computing resource(s) 116. At a first time, the device state 226 of the light(s) 322 may be an off state, such that the light(s) 322 are currently turned off. As a result, the selectable control depicted within the application 122 may be to turn on 412 the light(s) 322. The user 104 may select that control in order to turn on the light(s) 322. FIG. 4B further illustrates that the user 104 has selected the on 324 selectable control in order to turn on the light(s) 322 (e.g., lights turned on 412).

Upon determining that the user 104 has selected a control to turn on the light(s) 322 via the application 122, the service provider 114 may update a current device state 226 of the light(s) 322. As a result of the change in device state 226 of the light(s) 322, the service provider 114 may dynamically adjust which selectable controls associated with the light(s) 322 are depicted within the application 122. Since the light(s) 322 have been turned on via the application 122, there is little sense in presenting a selectable control to turn on the light(s) 322 (they are already on). Instead, the service provider 114 may identify and dynamically present selectable controls that are relevant and apply to the currently turned on lights 322, which may result in a modified application 232 that is dynamically presented to the user 104 via his/her user device 106.

The selectable controls that are depicted within the modified application 232 and that are presented to the user 104 may include a selectable control to adjust a brightness level of the light(s) 322, such as a first selectable control to turn the light(s) 322 brighter 414 and a second selectable control to dim 416 the light(s) 322. The modified application 232 may also include a selectable control to turn off 324 the light(s) 322. Therefore, the selectable controls that represent operations that can be performed with respect to the light(s) 322 may be based on previous requested operations of the user 104 and a current device state 226 of the device 108.

Figure 5:
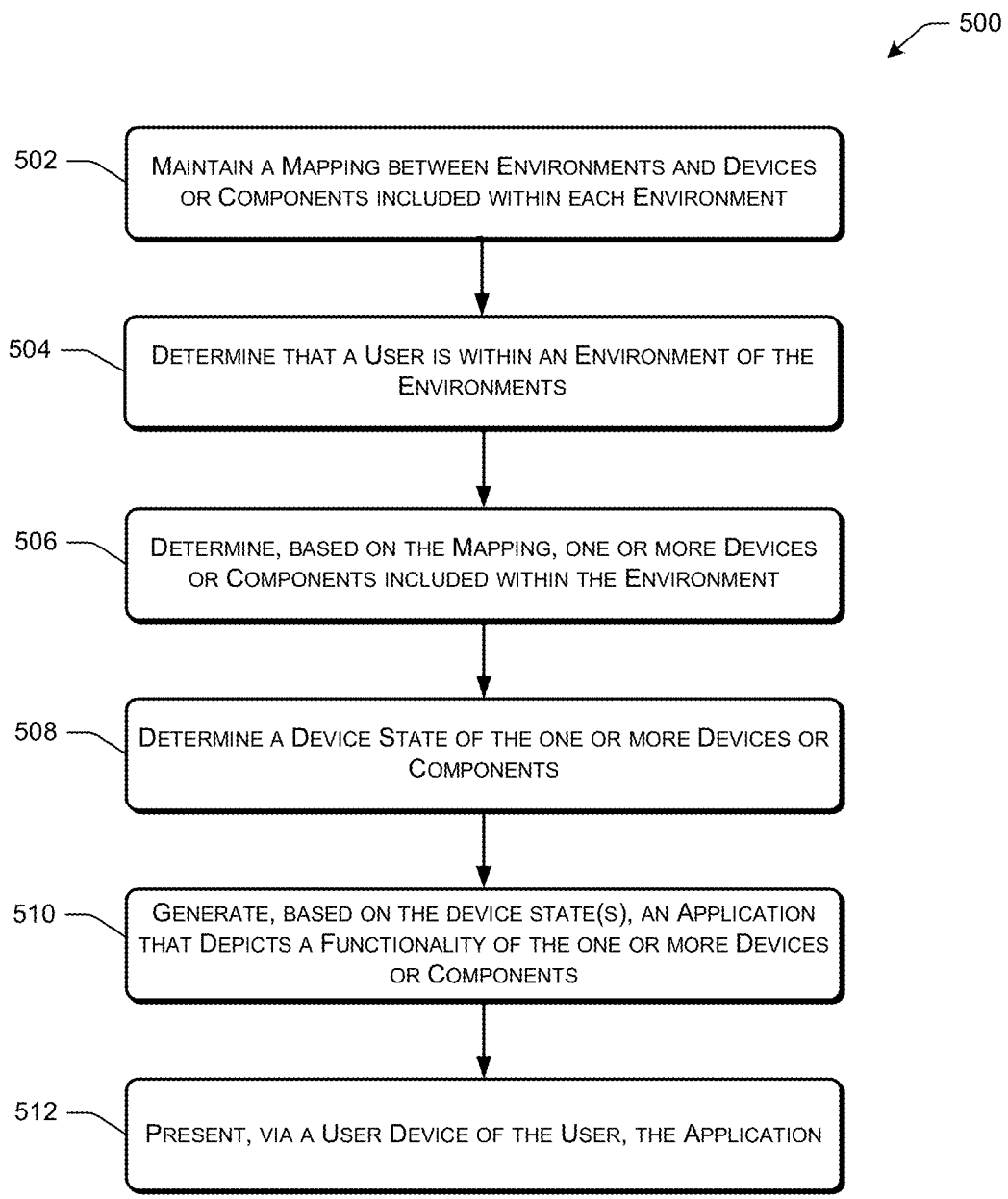
FIG. 5 illustrates a flow diagram of an example process for presenting an application that depicts devices and components within an environment that a user may activate or control based on a current device state of the devices/components.
Figure 6:
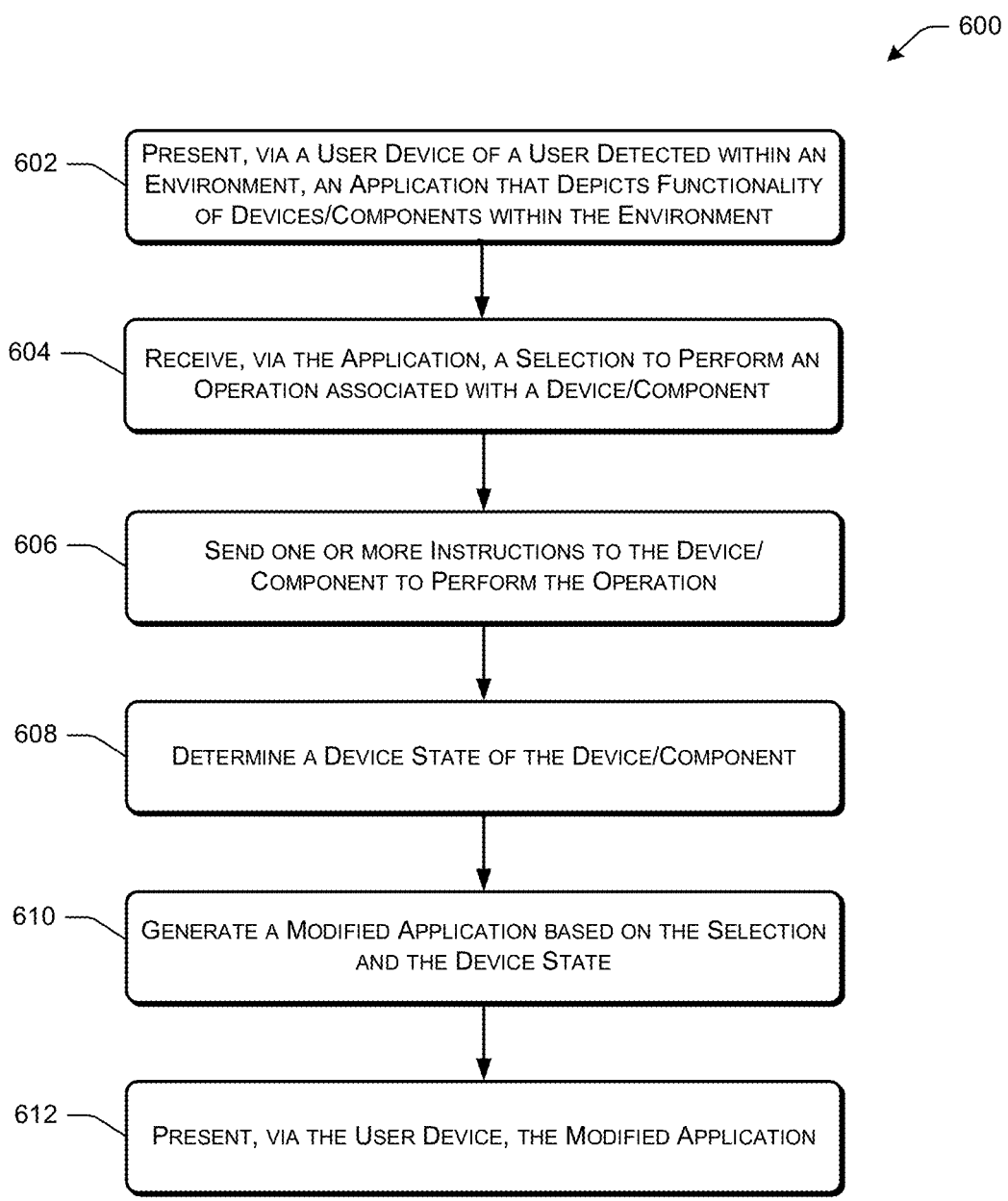
FIG. 6 illustrates a flow diagram of an example process for presenting a modified version of an application that depicts devices and components within an environment that a user may activate or control based on a current device state of the devices/components and a user selection via the application.

FIGS. 5 and 6 illustrate example processes of generating and updating an application 122 that depicts devices 108 within an environment 102 that may be activated and controlled by a user 104 within the environment 102 via the application 122. These processes (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 5 illustrates a flow diagram of an example process 500 of generating and presenting an application 122 that depicts devices 108 within an environment 102 that may be activated and controlled by a user 104 within the environment 102 via the application 122. Moreover, the following actions described with respect to FIG. 5 may be performed by the remote computing resource(s) 112, as illustrated with respect to FIGS. 1-4.

Block 502 illustrates maintaining a mapping between environments and devices or components included within each environment. In particular, the service provider 114 may generate and/or maintain one or more environment-device mappings 212 that associate an environment 102 with one or more devices 108/components that are physically located within the environment 102.

Block 504 illustrates determining that a user is within an environment of the environments. In some embodiments, the user 104 may be determined to be within the environment 102 based on Bluetooth LE beacons that are broadcast by one or more devices 108 within the environment 102 and that are detected by a user device 106 of the user 104. In other embodiments, the user 104 may be detected based on a captured image/video that depicts the user 104, and/or user interaction with the user device 106 and/or the application 122.

Block 506 illustrates determining, based on the mapping, one or more devices or components included within the environment. Based on the specific environment 102 at which the user 104 is determined to be located, the service provider 114 may identify the devices 108/components that are within that environment 102. Such devices 108/components may be activated and controlled by the user 104.

Block 508 illustrates determining a device state of the one or more devices or components. In various embodiments, the service provider 114 may determine a device state 226 of the devices 108/components within the environment 102, such as whether the devices 108/components are currently on/off, active/inactive, open/closed, and so on. Since the devices 108/components may be communicatively coupled to the remote computing resource(s) 112 and/or the third party computing resource(s) 116, the current device states 226 of the device(s) 108/components may be transmitted by the devices 108/components, and maintained by (and refreshed by) the remote computing resource(s) 112.

Block 510 illustrates generating, based on the device state(s), an application that depicts a functionality of the one or more devices or components. Upon determining the devices 108/components within the environment 102 and the current device states 126 of the devices 108/components, the service provider 114 may generate and maintain an application 122 that depicts the devices 108/components within the environment 102 that the user 104 may activate and control via the application 122. The application 122 may also dynamically depict one or more selectable controls with respect to functions, capabilities, and operations that can be performed with respect to the devices 108/components.

Block 512 illustrates presenting, via a user device, the application. After the user 104 has entered the environment 102, the user 104 may open or access the application 122 via his/her user device 106. The application 122 may be dynamically updated by the remote computing resource(s) 112 and/or the service provider 114 based on the current device states 226 of the devices 108/components that are physically located within the environment 102.

FIG. 6 illustrates a flow diagram of an example process 600 of presenting and updating an application 122 that depicts devices 108 within an environment that may be activated and controlled by a user 104 within the environment 102 via the application 122. Moreover, the following actions described with respect to FIG. 6 may be performed by the remote computing resource(s) 112, as illustrated with respect to FIGS. 1-4.

Block 602 illustrates presenting, via a user device of a user detected within an environment, an application that depicts functionality of devices/components within the environment. Based on a determination that a user 104 is within an environment 102, an identification of devices 108/components within the environment 102, and a determination of the device states 226 of the devices 108/components, the service provider 114 may generate and present, to the user device 106, the application 122. The application 122 may dynamically depict the devices 108/components that may be activated and controlled by the user 104 via the application 122, as well as a functionality and/or capabilities of the devices 108/components. The operations that may be performed with respect to the devices 108/components may be depicted within the application 122 as one or more buttons, controls, etc. that are selectable by the user 104.

Block 604 illustrates receiving, via the application, a selection to perform an operation associated with a device/component. In order to perform an operation within the environment 102, the user 104 may select a selectable control associated with one of the devices 108/components.

Block 606 illustrates sending one or more instructions to the device/component to perform the operation. Upon the user 104 selecting the selectable control, the application 122 may transmit data that represents the selection to the remote computing resource(s) 112. Based on the data, the service provider 114 may identify the requested operation of the user 104. The service provider 114 may then send one or more instructions to the device 108/component that is to perform the requested operation, where the instructions cause the device 108/component to perform the requested operation.

Block 608 illustrates determining a device state of the device/component. After causing the device 108/component to perform the requested operation, the service provider 114 may determine the current device state 226 of the device 108/operation. For instance, assume that the device 108/component is one or more lights 322 within the environment 102 that are communicatively coupled to the remote computing resource(s) 112 or the third party computing resource(s) 116, and that the lights 322 were initially turned off. Accordingly, the selectable control actuated by the user 104 via the application 122 may corresponding to turning on the lights 322. As a result the current device state 226 of the lights 322 is "on." The current device state 226 may be maintained and updated by the remote computing resource(s) 112.

Block 610 illustrates generating a modified application based on the selection and the device state. Referring to the example in the preceding paragraph, the selectable controls associated with the light(s) 322 may be dynamically updated based on the lights 322 being turned on. For instance, instead of a selectable control to turn on the lights 322, the application 122 may be dynamically updated to include a first selectable control to adjust a brightness level of the lights 322 and a second selectable control to turn off the lights 322, resulting in a modified application 232.

Block 612 illustrates presenting, via the user device, the modified application. The modified application 232 with the dynamically updated selectable controls may then be presented to the user 104 via his/her user device 106.

Figure 7:
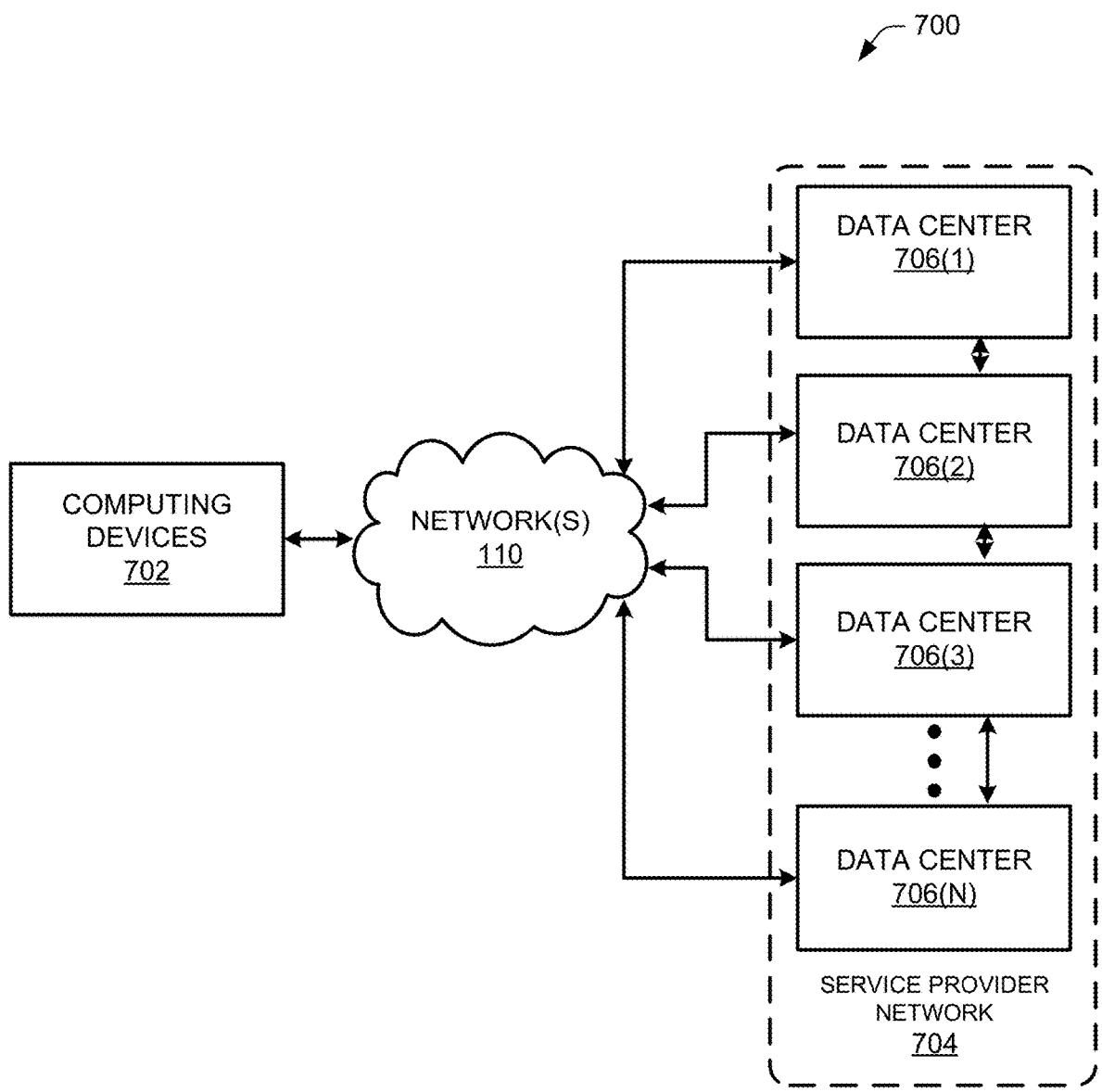
FIG. 7 is a block diagram that shows one illustrative operating environment for the examples disclosed herein that includes a service provider network.

FIG. 7 is a block diagram that shows an illustrative operating environment 700 for the examples disclosed herein that includes a service provider network. FIG. 7 and the following description are intended to provide a brief, general description of a suitable computing environment in which the examples described herein may be implemented. In particular, FIG. 7 is a system and network diagram that shows an illustrative operating environment that includes one or more computing devices 702 and a service provider network 704. As discussed above, service provider network 704 can provide virtual machine instances and computing resources on a permanent or an as-needed basis.

The computing resources provided by the service provider network 704 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by service provider network 704 are enabled in one implementation by one or more data centers 706(1)-706(N) (which may be referred to herein singularly as "a data center 706" or collectively as "the data centers 706"). The data centers 706 are facilities utilized to house and operate computer systems and associated components. The data centers 706 typically include redundant and backup power, communications, cooling and security systems. The data centers 706 might also be located in geographically disparate locations. One illustrative configuration for a data center 706 that implements some or all of the concepts and technologies disclosed herein will be described below with regard to FIG. 8.

The users 104 and customers of service provider network 704 may access the computing resources provided by the data centers 706 over a suitable data communications network, such as a Wide Area Network ("WAN"), as illustrated by network(s) 110. Although a WAN might be used, it should be appreciated that a local-area network ("LAN"), the Internet, or any other networking topology known in the art that connects the data centers 706 to the computing devices 702 (such as the user device 106 illustrated in FIG. 1) may be utilized. It should also be appreciated that combinations of such networks might also be utilized.

FIG. 8 is a block diagram that illustrates an illustrative architecture 800 of one configuration for a data center 706 that implements aspects of the service provider network 704, including some or all of the concepts and technologies disclosed herein. The example data center 706(1) shown in FIG. 8 includes several server computers 802A-802F (which may be referred to herein singularly as "a server computer 802" or in the plural as "the server computers 802") for providing computing resources. The server computers 802 may be standard tower or rack-mount server computers configured appropriately for providing the computing resources described herein. According to an example, the server computers 802 are configured to execute the software products as described above.

In an example, some of the computing resources 804 are virtual machine instances. As known in the art, a virtual machine instance is an instance of a software implementation of a machine (i.e. a computer) that executes programs like a physical machine. Each of the server computers 802 may be configured to execute an instance manager capable of instantiating and managing computing resources and instances of computing resources. In the case of virtual machine instances, for example, the instance manager might be a hypervisor or another type of program configured to enable the execution of multiple virtual machine instances on a single server computer 802, for example.

It should be appreciated that although the examples disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 706(1) shown in FIG. 8 also includes a server computer 802F reserved for executing software components for managing the operation of the data center 706(1), the server computers 802, virtual machine instances, and other resources within the service provider network 704. For instance, the server computer 802F, and/or any other server computer 802, may maintain and/or execute the application generation component 228 and the application modification component 230 depicted in FIG. 2. The server computer 802F might also execute one or more managers 808 and include one or more data stores 810. In this regard, it should be appreciated that while these components are illustrated as executing within service provider network 704, computing systems that are external to service provider network 704 might also be utilized to execute some or all of these components. Other configurations might also be utilized.

In the example data center 706(1) shown in FIG. 8, an appropriate local area network ("LAN") 806 is utilized to interconnect the server computers 802A-802E and the server computer 802F. The LAN 806 is also connected to the network(s) 112 illustrated in FIG. 7. It should be appreciated that the configuration and network topology illustrated in FIGS. 7 and 8 has been greatly simplified and that many more computing systems, networks and networking devices may be utilized to interconnect the various computing systems disclosed herein. Appropriate load balancing devices or software modules might also be utilized for balancing a load between each of the data centers 706(1)-706(N), between each of the server computers 802A-802F in each data center 706 and between virtual machine instances and other types of computing resources provided by the service provider network 704.

It should be appreciated that the data center 706(1) described in FIG. 8 is merely illustrative and that other implementations might also be utilized. Additionally, it should be appreciated that the functionality provided by these components might be implemented in software, hardware, or a combination of software and hardware. Other implementations should be apparent to those skilled in the art.

Although the subject matter presented herein has been described in language specific to computer structural features, methodological acts and computer readable media, it is to be understood that the subject matter defined in the appended claims is not necessarily limited to the specific features, acts, or media described herein. Rather, the specific features, acts and media are disclosed as example forms of implementing the claims. Moreover, the subject matter described above is provided by way of illustration only and should not be construed as limiting.

What is claimed is:

1. A method comprising:
receiving, via a user device, a first request to create or join a video meeting;
identifying, based at least in part on the first request and current location data associated with the user device, one or more potential meeting rooms to host the video meeting;
causing display, via the user device, of one or more selectable controls that allow the user device to create or join the video meeting in association with the one or more potential meeting rooms;
receiving, via the user device, a first selection of a first selectable control corresponding to a meeting room of the one or more potential meeting rooms, the first selection representing a second request to create or join the video meeting with respect to the meeting room;
based at least in part on the first selection of the first selectable control, causing the user device to join the video meeting by activating at least one of one or more microphones or one or more video cameras located within the meeting room, wherein participants of the video meeting are physically located in the meeting room or attend the video meeting virtually;
causing display, via the user device, of a second selectable control to view a plurality of settings associated with the meeting room;
receiving, via the user device, a second selection of the second selectable control to view the plurality of settings;
causing display, via the user device and based at least in part on the second selection of the second selectable control, of a plurality of selectable controls associated with the plurality of settings, the plurality of settings being associated with the one or more video cameras, the one or more microphones, one or more speakers physically located in the meeting room, and an option to leave the video meeting;
receive, via the user device, a third selection of a third selectable control of the plurality of selectable controls that corresponds to a setting of the plurality of settings; and
performing, based at least in part on the third selection of the third selectable control, an action associated with the setting.

2. The method as recited in claim 1, further comprising identifying the one or more potential meeting rooms based at least in part on at least one of first calendar data associated with a user associated with the user device or second calendar data associated with the one or more potential meeting rooms.

3. The method as recited in claim 1, further comprising identifying the one or more potential meeting rooms based at least in part on one or more Bluetooth signals that are broadcast by one or more conferencing devices located in the one or more potential meeting rooms and that are detected by the user device.

4. The method as recited in claim 1, wherein the setting corresponds to the one or more video cameras and the action is to turn on or turn off the one or more video cameras.

5. The method as recited in claim 1, wherein the setting corresponds to the one or more microphones and the action is mute or unmute the one or more microphones.

6. The method as recited in claim 1, wherein the setting corresponds to the one or more speakers and the action is to adjust a volume of audio that is associated with the video meeting and that is output by the one or more speakers.

7. The method as recited in claim 1, wherein the setting corresponds to the option to leave the video meeting and the action is to end the video meeting with respect to the user device.

8. The method as recited in claim 1, wherein the video meeting occurs via a mobile application residing on the user device.

9. A system comprising:
one or more processors;
memory; and
one or more computer-executable instructions stored in the memory and executable by the one or more processors to perform operations comprising:
receiving, via a user device, a first request to create a video meeting;
identifying, based at least in part on the first request and current location data associated with the user device, one or more potential meeting rooms to host the video meeting;
causing display, via the user device, of one or more selectable controls that allow the user device to create the video meeting in association with the one or more potential meeting rooms;
receiving, via the user device, a first selection of a first selectable control corresponding to a meeting room of the one or more potential meeting rooms, the first selection representing a second request to create the video meeting with respect to the meeting room;
based at least in part on the first selection of the first selectable control, initiating the video meeting and causing the user device to join the video meeting by activating at least one of one or more microphones or one or more video cameras located within the meeting room, wherein participants of the video meeting are physically located in the meeting room or attend the video meeting virtually;
causing display, via the user device, of a second selectable control to view a plurality of settings associated with the meeting room;
receiving, via the user device, a second selection of the second selectable control to view the plurality of settings;
causing display, via the user device and based at least in part on the second selection of the second selectable control, of a plurality of selectable controls associated with the plurality of settings, the plurality of settings being associated with the one or more video cameras, the one or more microphones, one or more speakers physically located in the meeting room, and an option to leave the video meeting;
receive, via the user device, a third selection of a third selectable control of the plurality of selectable controls that corresponds to a setting of the plurality of settings; and
performing, based at least in part on the third selection of the third selectable control, an action associated with the setting.

10. The system as recited in claim 9, wherein the operations further comprise identifying the one or more potential meeting rooms based at least in part on at least one of first calendar data associated with a user associated with the user device or second calendar data associated with the one or more potential meeting rooms.

11. The system as recited in claim 9, wherein the operations further comprise identifying the one or more potential meeting rooms based at least in part on one or more Bluetooth signals that are broadcast by one or more conferencing devices located in the one or more potential meeting rooms and that are detected by the user device.

12. The system as recited in claim 9, wherein the setting corresponds to the one or more video cameras and the action is to turn on or turn off the one or more video cameras.

13. The system as recited in claim 9, wherein the setting corresponds to the one or more microphones and the action is mute or unmute the one or more microphones.

14. The system as recited in claim 9, wherein the setting corresponds to the one or more speakers and the action is to adjust a volume of audio that is associated with the video meeting and that is output by the one or more speakers.

15. The system as recited in claim 9, wherein the setting corresponds to the option to leave the video meeting and the action is to end the video meeting with respect to the user device.

16. One or more non-transitory computer-readable media storing one or more computer-executable instructions that, when executed by one or more processors, cause the one or more processors to perform operations comprising:
   receiving, via a user device, a first request to join a video meeting;
   identifying, based at least in part on the first request and current location data associated with the user device, one or more potential meeting rooms to host the video meeting;
   causing display, via the user device, of one or more selectable controls that allow the user device to join the video meeting in association with the one or more potential meeting rooms;
   receiving, via the user device, a first selection of a first selectable control corresponding to a meeting room of the one or more potential meeting rooms, the first selection representing a second request to join the video meeting with respect to the meeting room;
   based at least in part on the first selection of the first selectable control, causing the user device to join the video meeting by activating at least one of one or more microphones or one or more video cameras located within the meeting room, wherein participants of the video meeting are physically located in the meeting room or attend the video meeting virtually;
   causing display, via the user device, of a second selectable control to view a plurality of settings associated with the meeting room;
   receiving, via the user device, a second selection of the second selectable control to view the plurality of settings;
   causing display, via the user device and based at least in part on the second selection of the second selectable control, of a plurality of selectable controls associated with the plurality of settings, the plurality of settings being associated with the one or more video cameras, the one or more microphones, one or more speakers physically located in the meeting room, and an option to leave the video meeting;
   receive, via the user device, a third selection of a third selectable control of the plurality of selectable controls that corresponds to a setting of the plurality of settings; and
   performing, based at least in part on the third selection of the third selectable control, an action associated with the setting.

17. The one or more non-transitory computer-readable media as recited in claim 16, wherein the operations further comprise identifying the one or more potential meeting rooms based at least in part on at least one of first calendar data associated with a user associated with the user device or second calendar data associated with the one or more potential meeting rooms.

18. The one or more non-transitory computer-readable media as recited in claim 16, wherein the operations further comprise identifying the one or more potential meeting rooms based at least in part on one or more Bluetooth signals that are broadcast by one or more conferencing devices located in the one or more potential meeting rooms and that are detected by the user device.

19. The one or more non-transitory computer-readable media as recited in claim 16, wherein, at least one of: the setting corresponds to the one or more video cameras and the action is to turn on or turn off the one or more video cameras; the setting corresponds to the one or more microphones and the action is mute or unmute the one or more microphones; the setting corresponds to the one or more speakers and the action is to adjust a volume of audio that is associated with the video meeting and that is output by the one or more speakers; or the setting corresponds to the option to leave the video meeting and the action is to end the video meeting with respect to the user device.

20. The one or more non-transitory computer-readable media as recited in claim 16, wherein the video meeting occurs via a mobile application residing on the user device.

* * * * *